(12) United States Patent
McAlister et al.

(10) Patent No.: US 11,679,780 B2
(45) Date of Patent: *Jun. 20, 2023

(54) METHODS AND SYSTEMS FOR MONITORING VEHICLE MOTION WITH DRIVER SAFETY ALERTS

(71) Applicant: Argo AI, LLC, Pittsburgh, PA (US)

(72) Inventors: Colen McAlister, Sunnyvale, CA (US); David Breeden, Belmont, CA (US); Thomas Petroff, Gibsonia, PA (US); Christopher Cunningham, Pittsburgh, PA (US); Patrick Barone, San Francisco, CA (US); Arek Sredzki, San Mateo, CA (US); Neal Seegmiller, Pittsburgh, PA (US); Xi Cai, San Jose, CA (US)

(73) Assignee: ARGO AI, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,582

(22) Filed: Oct. 28, 2022

(65) Prior Publication Data

US 2023/0054145 A1 Feb. 23, 2023

Related U.S. Application Data

(63) Continuation of application No. 17/144,441, filed on Jan. 8, 2021.

(51) Int. Cl.
*B60W 50/00* (2006.01)
*B60W 50/14* (2020.01)
(Continued)

(52) U.S. Cl.
CPC .......... *B60W 50/14* (2013.01); *G06V 10/25* (2022.01); *G06V 20/588* (2022.01);
(Continued)

(58) Field of Classification Search
CPC .......... B60W 50/14; B60W 2050/143; G06V 10/25; G06V 20/588; G08G 1/0145; G08G 1/097
(Continued)

(56) References Cited

U.S. PATENT DOCUMENTS 11,210,537 B2  12/2021  Koivisto
11,403,069 B2 *  8/2022  Bannon .................. G06F 7/575
(Continued)

FOREIGN PATENT DOCUMENTS

WO    2018030082 A1    2/2018

OTHER PUBLICATIONS

Aliane, N. et al., "A System for Traffic Violation Detection," Sensors 2014, 14, doi:10.3390/s141122113, pp. 22113-22127.
(Continued)

*Primary Examiner* — Ian Jen
(74) *Attorney, Agent, or Firm* — Fox Rothschild LLP

(57) ABSTRACT

Methods, systems, and computer program products for navigating a vehicle are disclosed. The methods include extracting lane segment data associated with lane segments of a vector map that are within a region of interest, and analyzing the lane segment data and a heading of the vehicle to determine whether motion of the vehicle satisfies a condition. The condition can be associated with (i) an association between the heading of the vehicle and a direction of travel of a lane that corresponds to the current location of the vehicle and/or (ii) a minimum stopping distance to an imminent traffic control measure in the lane that corresponds to the current location of the vehicle. When the motion does not satisfy the condition, the methods include causing the vehicle to perform a motion correction.

20 Claims, 12 Drawing Sheets

(51) Int. Cl.
  G08G 1/01 (2006.01)
  G08G 1/097 (2006.01)
  G06V 10/25 (2022.01)
  G06V 20/56 (2022.01)
(52) U.S. Cl.
  CPC ........... G08G 1/0145 (2013.01); G08G 1/097 (2013.01); B60W 2050/143 (2013.01)
(58) Field of Classification Search
  IPC .................................................. B60W 50/00
  See application file for complete search history.

(56) References Cited

U.S. PATENT DOCUMENTS

| | | | | |
|---|---|---|---|---|
| 11,535,271 | B2* | 12/2022 | McAlister | .............. G08G 1/097 |
| 2012/0065878 | A1 | 3/2012 | Yeh et al. | |
| 2018/0188060 | A1 | 7/2018 | Wheeler et al. | |
| 2020/0025583 | A1 | 1/2020 | Herlocker | |
| 2020/0132477 | A1 | 4/2020 | Averilla | |
| 2020/0258390 | A1 | 8/2020 | Raichelgauz et al. | |
| 2022/0326711 | A1* | 10/2022 | Gutlansky | ............ G05D 1/0088 |

OTHER PUBLICATIONS

"U-Turn Policies," https://desktop.arcgis.com/en/arcmap/latest/extensions/network-analyst/u-turn-policies.htm, Copyright 2020.

Urmson, C. et al., "Autonomous Driving in Urban Environments: Boss and the Urban Challenge," Journal of Field Robotics DOI 10.1002/rob, 2008, pp. 425-466.

Shen, Y. et al., "Extracting Centerlines from Dual-Line Roads Using Superpixel Segmentation," IEEE, vol. 7, 2019, Digital Object Identifier 10.1109/ACCESS.2019.2895016, pp. 15967-15979.

* cited by examiner

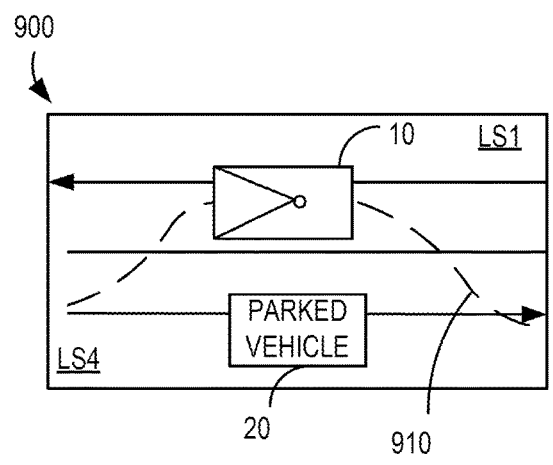
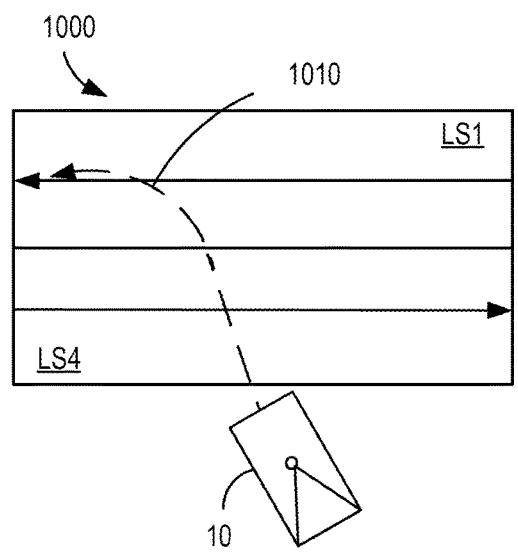
FIG. 9
FIG. 10
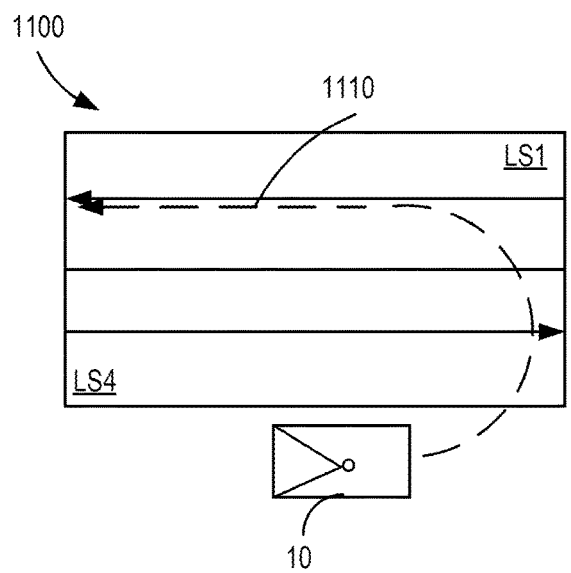
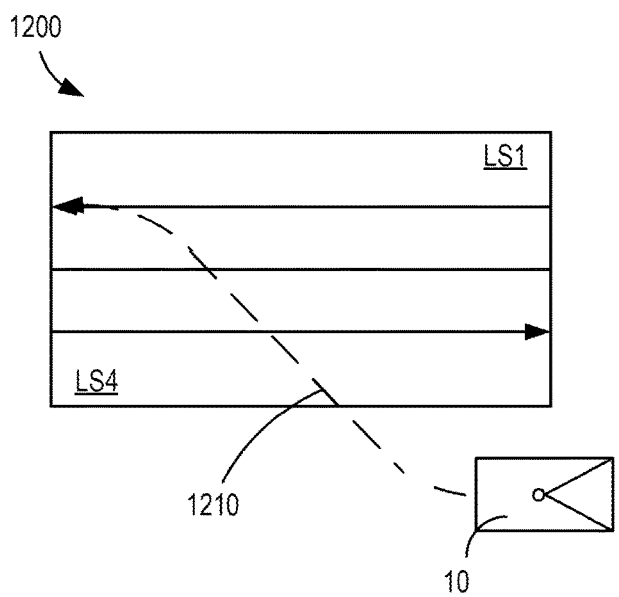
FIG. 11
FIG. 12

METHODS AND SYSTEMS FOR MONITORING VEHICLE MOTION WITH DRIVER SAFETY ALERTS

CLAIM OF PRIORITY

This patent application claims the benefit of priority to U.S. patent application Ser. No. 17/144,441 filed Jan. 8, 2021, which is incorporated herein by reference in its entirety.

BACKGROUND

A driver of a vehicle relies on signage painted on the roadways or signposts on the side of the roadways to adapt the speed of the vehicle and steering to control the direction of travel along one-way roads, two-way roads, bridges, parking lots, and garages, for example. When a driver is driving along a road, the driver's attention may be diverted in the direction of moving or stationary objects, pedestrians and the like. A driver's attention may be diverted when the driver is changing the radio station or adjusting the vehicle's climate control. It is also common for a driver to consume food and beverages, talk on the phone or text while driving. All of these tasks can take the driver's attention off the road even if it is only for a second. As a consequence, certain traffic control measures, such as traffic stop signs and a change in color of a traffic light may go unseen. This can cause the driver to fail to stop at a stop sign or a red light, for example. Failing to stop at a stop sign, a red light or other traffic control measures increases the likelihood of a collision by the vehicle with another vehicle or pedestrian.

A driver can have their attention focused on the road 100% of the time. However, in some instances, traffic signs can be obscured from the driver's view partially or completely, such as by trees or bushes, which may prevent the driver from stopping at the stop sign. In other instances, once the driver sees the traffic sign, it may be too late for the driver to decelerate the vehicle at a rate sufficient to stop for the traffic sign. A driver may not see a one-way sign blocked by trees or bushes while turning onto a road, which has an opposite heading than the direction of travel of the vehicle. Driving against traffic also increases the likelihood of a collision by the vehicle with another vehicle or pedestrian.

This document describes methods and systems that are directed to addressing the problems described above, and/or other issues.

SUMMARY

In various scenarios, this document describes methods, systems, and computer program products for navigating a vehicle by extracting lane segment data associated with lane segments of a vector map that are within a region of interest, and analyzing the lane segment data and a heading of the vehicle to determine whether motion of the vehicle satisfies a condition. The condition can be associated with (i) an association between the heading of the vehicle and a direction of travel of a lane that corresponds to the current location of the vehicle and/or (ii) a minimum stopping distance to an imminent traffic control measure in the lane that corresponds to the current location of the vehicle. When the motion does not satisfy the condition, the methods include causing the vehicle to perform a motion correction.

BRIEF DESCRIPTION OF THE DRAWINGS

FIG. 9 illustrates an example scenario of the vehicle veering around a parked car into a wrong-way lane.

FIG. 10 illustrates an example scenario of the vehicle navigating across a two-way road from outside of the vehicle lanes by making a left turn in a distal vehicle lane.

FIG. 11 illustrates an example scenario of the vehicle navigating across a two-way street from outside of the vehicle lanes by making a U-turn.

FIG. 12 illustrates another example scenario of the vehicle navigating across a two-way street from outside of the vehicle lanes by making a left turn in a distal vehicle lane.

DETAILED DESCRIPTION

Figure 1:
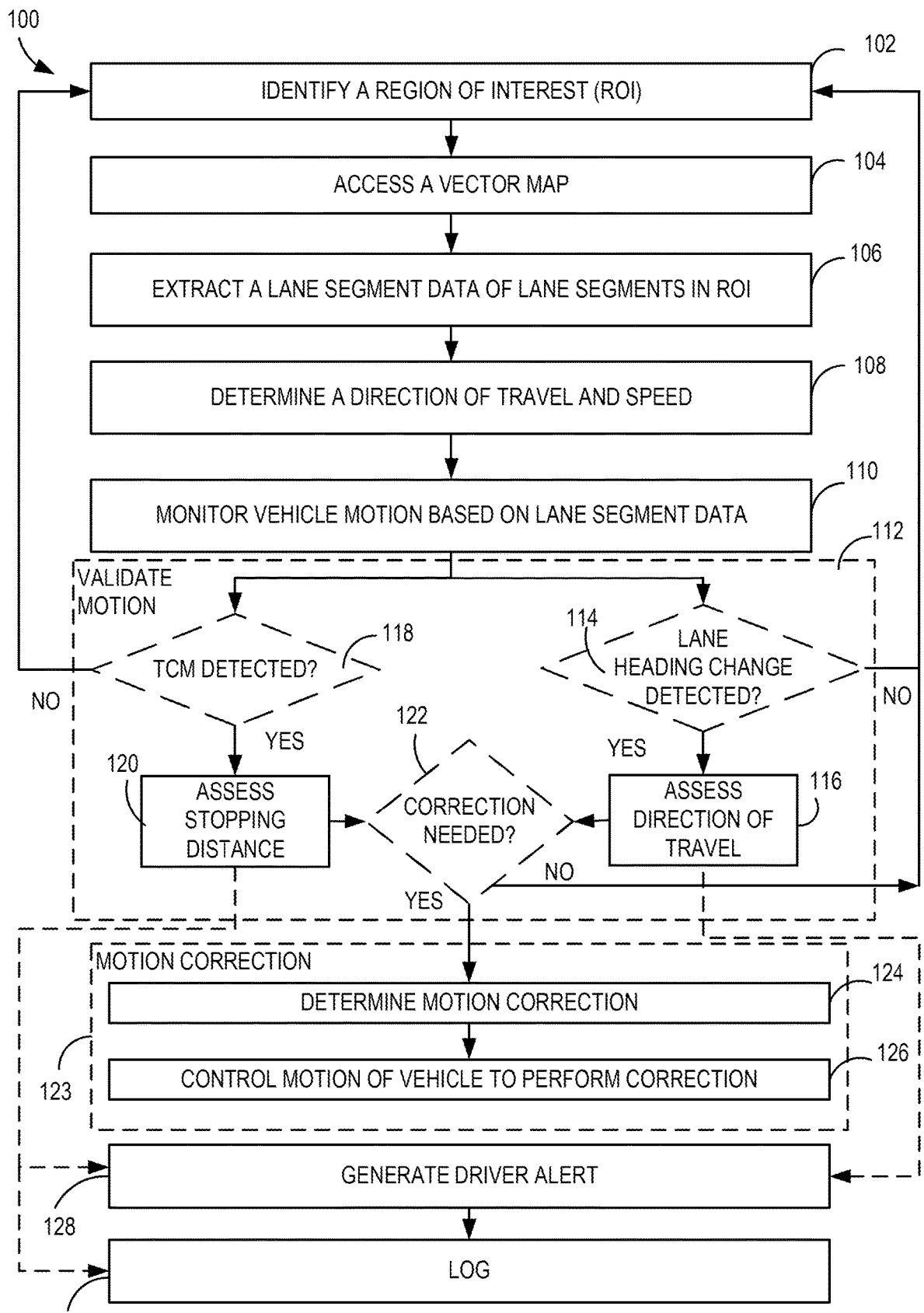
FIG. 1 illustrates a flow chart of an example method for validating motion of a vehicle along a path based on high-definition map data.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

As used in this disclosure, the term "wrong-way direction" is intended to refer to an assigned heading of a lane segment that is opposite the computed heading or direction of travel of the vehicle within a preset tolerance.

As used in this disclosure, the term traffic control measure (TCM) refers to an object that is installed along, in, or over a lane of a road to control the flow of traffic by slowing and/or stopping the traffic under certain conditions. Examples of TCMs include a stop sign, traffic light signal, a yield sign, a pedestrian crosswalk, and a speed bump.

As used in this disclosure, the term "vector map" refers to a high-definition set of digital map data that represents roads using polygons that are split-up into smaller chunks called "lane segments." Each lane segment is represented by a polygon that has a lane centerline with at least one of a heading and a length. Each lane segment may include a width.

In this document, the term "region of interest" (ROI) is an area defining some or all vehicle lanes in proximity to a location of the vehicle. The ROI will include the vehicle and all lane segments that are present within a radius that extends from the vehicle. The radius may be a fixed value, or it may have a value that increases as vehicle speed increases, and that decreases as vehicle speed decreases. The vehicle lanes include one or more of the following: (1) a travel lane with the same heading that the vehicle is currently traveling; (2) a lane with an opposite heading of the vehicle and parallel and adjacent to the travel lane; and/or (3) any intersecting lane within a predetermined number of feet of the current location of the vehicle. The ROI may place the vehicle at a center point of the area.

Definitions for additional terms that are relevant to this document are included at the end of this Detailed Description.

In an embodiment, an automated vehicle operating in an environment may use sensors to automatically identify the current speed and direction of travel of the vehicle. When a driver is manually operating a fully automated vehicle in a manual mode, or when the driver is operating a semi-autonomous vehicle that includes driver assistance capabilities, the vehicle uses data from a high-definition map of the area to validate its motion so that the driver may be alerted if they are: (a) in danger of failing to stop for a traffic control measure or (b) driving the wrong-way (i.e., against the heading of a lane segment).

In some embodiments, the data of the high-definition map may be used to alert the driver of driving the wrong-way down a one-way street, for example. Driving the wrong-way can happen, for example, if the "one way" aspect of the street is poorly signposted or missing. This can also happen, for example, when a driver unknowingly drives onto interstate lanes in the opposing direction when it is late at night.

In some embodiments, the data of the high-definition map may be used to alert the driver of an out-of-limit deceleration rate to stop within the stopping distance to the next active traffic control measure.

The methods and systems will be described in relation to FIGS. 1-4C and 17. The method steps may be performed in the order shown or a different order. One or more of the steps may be performed contemporaneously. Furthermore, one or more steps may be added or omitted in an iteration.

FIG. 1 illustrates a flow chart of an example method 100 for validating motion of a vehicle such as an automated vehicle 10 (FIG. 5) along a path based on high-definition map data 1771 (FIG. 17) associated with a high-definition map. In various embodiments, the high-definition map may be a vector map.

At 102, the on-board computing device 1710 may identify a ROI in an immediate vicinity of a current location of the automated vehicle 10. The system may do this by retrieving global positioning system (GPS) data that includes coordinates of the current location, by receiving images of the current location from one or more onboard cameras and processing the images to identify one or more landmarks having known coordinates, and/or other procedures. At 104, the on-board computing device 1710 may access a vector map that includes those lane segments in the ROI and, at 106, extract lane segment data 1774 (FIG. 17) associated with the plurality of lane segments that are within the ROI. The vector map may be stored onboard the vehicle in a memory, and the vector map may include coordinates that the vehicle uses to select the correct vector map that includes coordinates of the ROI.

Figure 17:
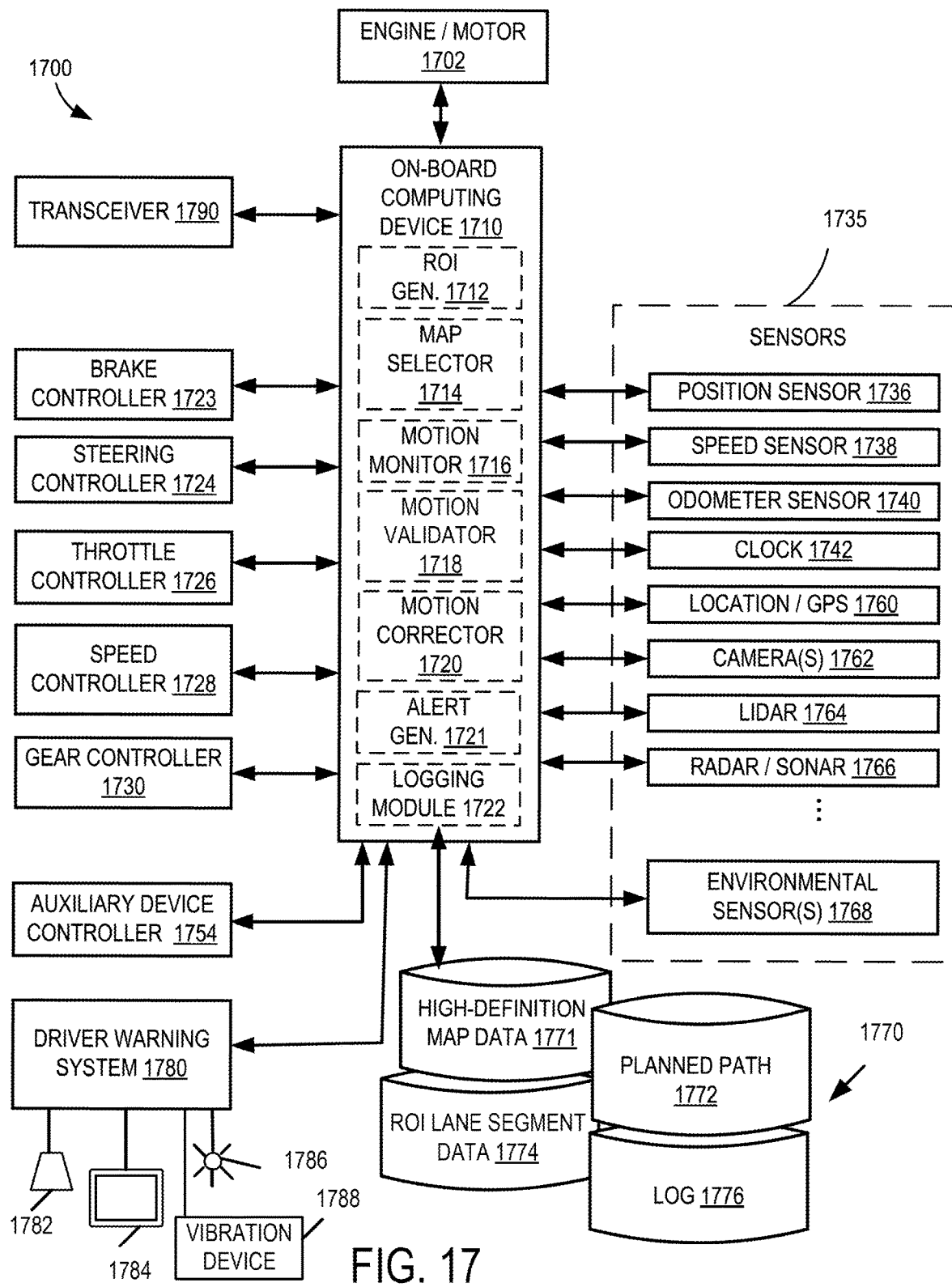
FIG. 17 illustrates an example system architecture with an on-board computing device for an automated vehicle.

At 108, the on-board computing device 1710 may determine a direction of travel or heading computed for the automated vehicle 10 based on data received from one or more of the sensors 1735 (FIG. 17). The on-board computing device 1710 may also determine the speed of the vehicle. The direction of travel may be based on a first tolerance. The first tolerance is an angular tolerance, and in particular a maximum angle between the vehicle's direction of travel and a reference line of a lane or lane segment in which the vehicle traveling, within which the lane or lane segment may be generally considered to be going in the same direction as the vehicle. The first tolerance may be relatively large, to avoid false positives in case the vehicle is veering or otherwise angled within the lane but still generally heading in the correct direction. For example, the first tolerance for the automated vehicle 10 may include ±1.3 radians or approximately ±74.48° relative to the lane's direction of travel or heading of the vector map to validate the direction of travel by the vehicle as the same direction or the correct-way. Although ±1.3 radians is used in this example, the first tolerance may range between ±1.1-1.9 radians, by way of non-limiting example. In addition, the system may also consider a distance-based measurement to be a second tolerance that it uses to determine whether the sensed direction of travel of the vehicle is a direction that is other than the lane's direction of travel. The second tolerance measures how far a vehicle may move away from the reference line before which the vehicle may be considered to be heading in direction other than that of the lane. The second tolerance also should be relatively large to avoid false positives, for example the approximate width of a typical lane of the lane's in the jurisdiction in which the lane is located (which in the United States is currently 3.6 meters). The third tolerance is the conceptual inverse of the first tolerance in that it is a minimum angle between the vehicle's facing direction and the reference line, beyond which a lane's direction may be opposite that if the vehicle. This angle should be relatively small to avoid false positives. For example, the third tolerance may be approximately ±0.35 radians or 20.05°, or in a range between ±0.03-0.044. Other values are possible. The tolerance ranges described herein may be compared with computed angles or radians, as shown in FIG. 7B, to determine a heading of the vehicle 10 relative to a particular lane segment.

The system may then use these tolerances to assess whether to monitor if the vehicle is traveling in a correct direction or a wrong-way direction as follows: (1) First, the system may search for all lanes whose direction is within the first tolerance of the vehicle's direction, and which are within a distance of the second tolerance of the vehicle. If any such lanes are found, then the vehicle is traveling in the same direction as a nearby lane, so the system may not need to activate the direction monitor. (In this case, the AV might have veered into an oncoming lane to pass an obstacle, for example). (2) If no such lanes are found, then the system may search for all lanes whose direction is within the third tolerance of the opposite of the vehicle's direction, and which are within a small threshold distance of the AV (e.g. within a vehicle-length diameter circle centered on the vehicle). If no such lanes are found in the second step, then the system may determine that the vehicle is not near an opposite-direction lane, so it may not activate the monitor. (In this instance, the vehicle may be in an unmapped parking lot, for example.) If the system finds no same-direction lanes nearby in step (1), and it finds an opposite direction lane nearby in step (2), then the system may determine that the vehicle is moving in the wrong direction for its lane, so the system will activate the monitor and/or trigger an alert.

At 110, the on-board computing device 1710 may monitor the motion of the vehicle 10 based on the lane segment data 1774 (FIG. 17). The motion may be based on the one or more sensors 1735 (FIG. 17) relative to a planned path 1772 stored in memory 1770, for example. The system 1700 (FIG. 17) includes various sensors 1735 for collecting real-time data associated with the automated vehicle to which the sensors 1735 are attached. The state of operation of the automated vehicle 10 includes, among other things, the current speed and the current direction of travel, for example, based on sensor data from the speed sensor 1748 (FIG. 17) and the location sensor 1744 (FIG. 17). The state of the automated vehicle 10 may include alignment of the vehicle body with a lane (i.e., the heading/orientation with respect to a lane segment), direction of travel, speed and/or acceleration, and heading and/or orientation.

At 112, the on-board computing device 1710 may validate the motion of the vehicle 10 by determining whether the vehicle's motion satisfies a condition, and in particular determining whether the vehicle's direction of travel corresponds to the direction of travel of the lane in which the vehicle is currently located. When validating the motion of the vehicle 10, the on-board computing device 1710 may use the lane segment data of the high-definition map data for any instantiation. For example, the on-board computing device 1710 may validate the motion of the vehicle by determining whether the vehicle's current lane heading changed (that is, whether the vehicle has moved into a lane or lane segment having a different heading), at 114, as will be described in relation to FIGS. 7A and 8. As the vehicle changes lane segments along the path, the current heading of the lane segment is retrieved from the lane segment data 1774.

If the determination, at 114, is "YES," an assessment of the direction of travel of the vehicle is performed, at 116. By way of non-limiting example, the assessment of the sensed direction of travel of the vehicle may perform a false positive analysis, as will be described in relation to FIG. 2. Depending on the assessment, as will be described in relation to FIG. 2, the driver may be alerted, at 128.

In some embodiments, at 122, the on-board computing device 1710 may make a determination of whether a correction is needed based on the assessment at 116. The decision shape of 122 is shown in dashed lines to denote that it is optional. If the determination at either 114 or 122 is "NO," the method may return to 102. For example, if the automated vehicle 10 is fully autonomous, there may be no need for an alert. Instead, the on-board computing device 1710 may determine a motion correction, for example, at 123. If the automated vehicle 10 is semi-autonomous, there may be a safety driver alert and, in some embodiments, the on-board computing device 1710 may determine a motion correction action that it causes a motion control system of the vehicle to take an action such as decelerating, stopping, and/or veering into a different lane segment.

By way of non-limiting example, the on-board computing device 1710 may validate the motion of the vehicle 10 by detecting whether there is an imminent traffic control measure, at 118, ahead of the vehicle. The system may detect whether an imminent traffic control measure is ahead by determining whether a measure present in the high-definition map data for any instantiation. Alternatively and/or in addition, the on-board computing device 1710 may receive notice of the traffic control measure via a vehicle-to-infrastructure (V2I) or other vehicle-to-everything (V2X)-type communication in which the TCM emits signals to oncoming vehicles to alert the vehicle of its presence and status. In the case of a traffic light, the vehicle also may determine whether the TCM is actively signaling the vehicle to slow or stop (such as a red or yellow traffic light), or whether the TCM will do so when it reaches the TCM, based on a status indicator included in a V2X communication, or by using onboard cameras to detect and determine a state of the light.

For example, at 118, the on-board computing device 1710 may validate the motion of the vehicle 10 by detecting whether there is a traffic control measure that is imminent in that it is (a) ahead of the vehicle, (b) in or associated with the vehicle's current lane, and (c) within the ROI or within a threshold distance from the ROI. If the determination is "NO," the method 100 may return to 102. On the other hand, if the determination is "YES," the on-board computing device 1710 may assess a minimum stopping distance as a distance from the vehicle's current location to a location in a stop zone that is ahead of (that is, before) the traffic control measure in front of the vehicle, at 120. In various embodiments, the assessment may determine that the vehicle 10 is traveling at a speed and/or decelerating at a rate that is within decelerating limits to stop for an imminent traffic control measure. As will be described in relation to FIGS. 4A-4C, if the motion of the vehicle finds that the decelerating rate necessary to stop for the imminent traffic control measure is out-of-limits, the driver is alerted, at 128 via an audible and/or visual alert. In some embodiments, at 120, the on-board computing device 1710 may log certain events or information related to traffic control measures, at 130, as described in relation to FIG. 4C.

In some embodiments, at 122, the on-board computing device 1710 may make a determination of whether a correction is needed to slow the vehicle. If the determination at either 118 or 122 is "NO," the method may return to 102. On the other hand, if the determination at 122 is "YES," then, at 123, the on-board computing device 1710 may perform a motion correction process.

The on-board computing device 1710 may perform a motion correction process by determining a particular motion correction, at 124, based on the assessments at 116 or 120, and cause the vehicle to perform the determined motion correction, at 126. By way of non-limiting example, if correction is needed in response to the assessment, at 120, the on-board computing device 1710 may determine that the vehicle 10 needs to slow down to adjust the stopping distance to the next traffic control measure. A correction may require the on-board computing device 1710 of the system 1700 to generate a speed control signal that is sent to the speed controller 1728 (FIG. 17) to change the speed of the vehicle. In some embodiments, the control signal may generate a braking control signal that is sent to the brake controller 1723 (FIG. 17) to reduce the speed. In some embodiments, the control signal may generate a steering control signal that is sent to the steering controller 1724 (FIG. 17).

In various scenarios, in response to determining that the direction of travel for the automated vehicle 10 is the wrong-way, a potential correction motion may include preventing the vehicle 10 from performing a veering motion into an adjacent lane having an opposing heading than the heading of the vehicle 10, at 126. Thus, the on-board computing device 1710 may generate a control signal that prevents the automated vehicle 10 from executing the veer into the adjacent lane. The control signal may include a steering control signal that is sent to the steering controller 1724 to prevent the steering of the vehicle to perform a "veering" motion. It should be understood, that depending on the scenario other corrective motions may be performed.

At 128, the on-board computing device 1710 may cause a driver warning system 1780 (FIG. 17) to provide an appropriate driver alert. For example, the driver warning system 1780 may include an audio speaker 1782 (FIG. 17), a display 1784 (FIG. 17), light indicator 1786 (FIG. 17) and/or vibration device 1788 (FIG. 17), any or all of which may be activated to output the alert. The alert may be audible through speaker 1782, an illumination of a designated light indicator 1786, a notification message or light on a display 1784 and/or vibration feedback via a vibration device 1788. The display may be a heads-up display. The vibration device may be integrated into a part of the vehicle, such as a driver seat, steering wheel, etc. By way of non-limiting example, if the vehicle 10 is detected driving the wrong-way, at 114, an audible alert may be generated to inform a human operator that the direction of travel or heading of the automated vehicle 10 is a wrong-way. The event data or information used in the wrong-way detection may be logged, at 130, so that a report can be generated for later analysis. For example, the signpost for the road may be missing. The logged data may be used to update a variety of vehicles including a fully autonomous vehicle using a computer vision system to identify signs along the road. In various embodiments, the "wrong-way" alert may be configured to repeat after a time period delay to avoid generating multiple alerts for the same incident. This may allow the vehicle 10 and/or human operator operating the vehicle to take corrective action. The alert may include one or more alert modes simultaneously. For example, driver warning system 1780 may generate an alert using one or more of the speaker 1782 (FIG. 17), the display 1784 (FIG. 17), light indicator 1786 (FIG. 17) and/or vibration device 1788 (FIG. 17), simultaneously.

Figure 5:
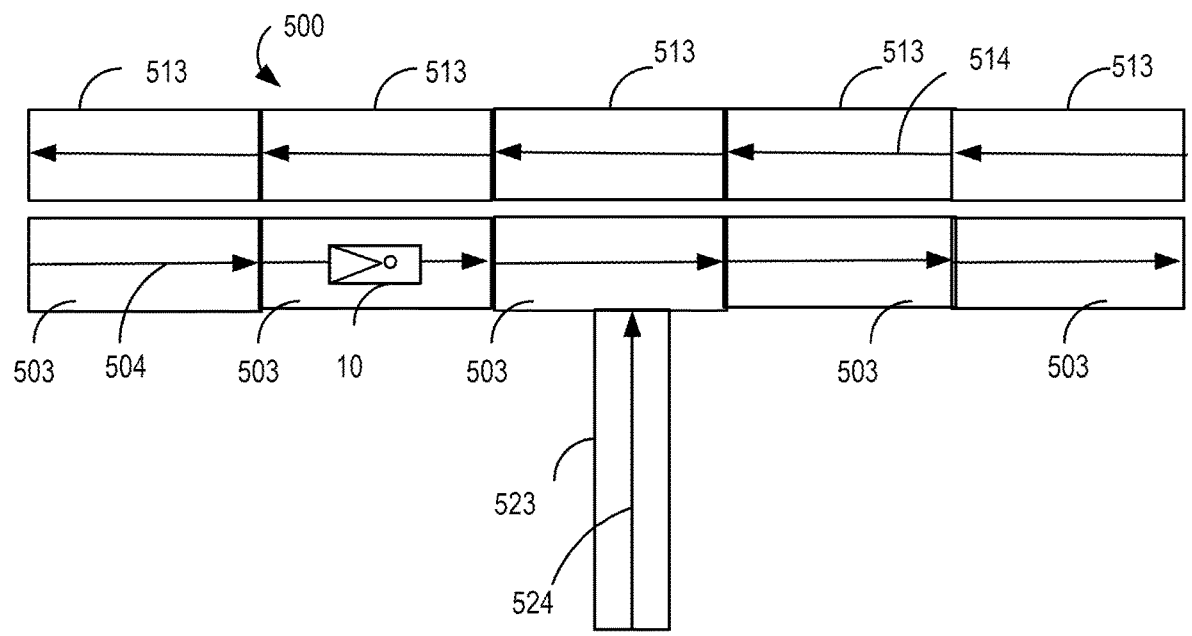
FIG. 5 illustrates an example scenario of a high-definition map of lane segments traveled by the vehicle.

For illustrative purposes and understanding, FIG. 5 is an example scenario of a high-definition map 500 of lane segments traveled by the vehicle 10, described above, at 102 and 104. The vehicle 10 is represented with an interior triangle. The apex of the triangle points in the direction of travel of the vehicle. Each of the lane segments 503 may be represented as a polygon that includes a heading 504, denoted by a first arrow, to associate the lane segment 503 with a lane's direction of travel. The map 500 also illustrates adjacent lane segments 513 that may be represented as a polygon having a heading 514, denoted by a second arrow, to associate the lane segment 513 with its lane's direction of travel. The headings 514 are in a different direction than headings 504 and are anti-parallel (i.e., the lane segments are parallel but vehicles within them will move in opposite directions). The map 500 may also include at least one lane segment 523 intersecting the lane segments 503. The at least one segment 523 may be represented as a polygon that includes a heading 524, denoted by a third arrow, which intersects heading 504 and 514. For example, lane segment 523 intersects lane 503 at approximately 90°. However, other intersecting lane segments may intersect at a different angle and this document should not be limited in any way to 90° intersections. In this example, the vehicle 10 is currently traveling in a direction of heading 504 of lane 503.

Figure 6:
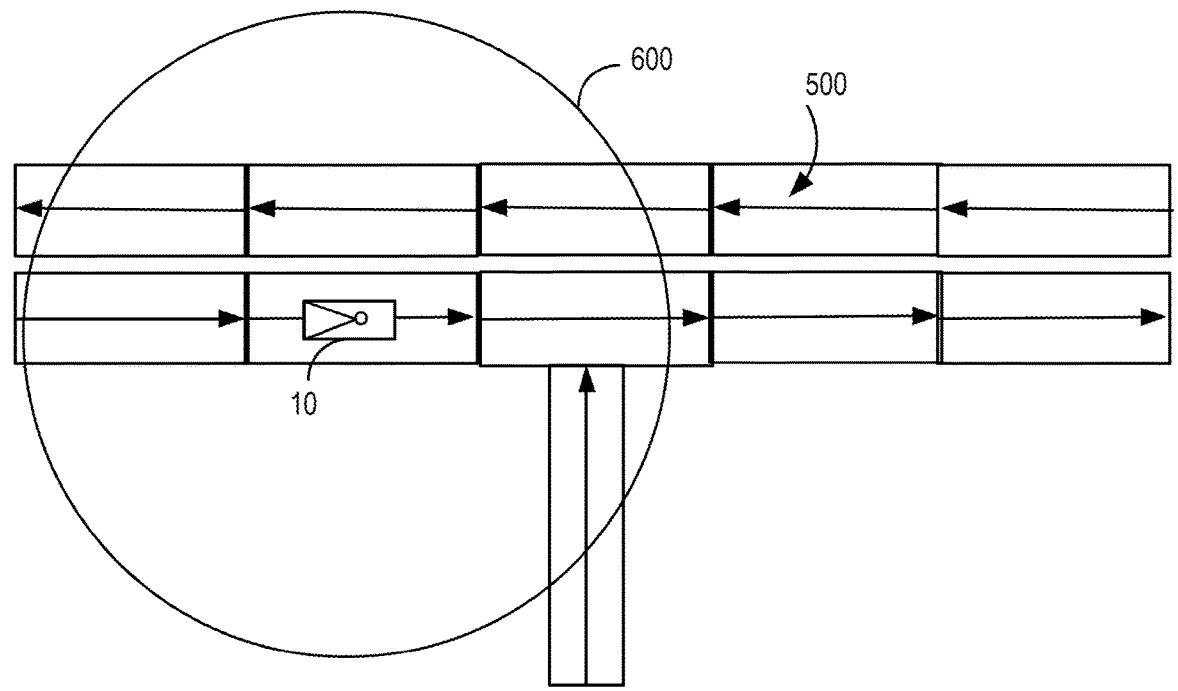
FIG. 6 illustrates an example circular region of interest with the vehicle in a center and overlaid on the map of lane segments of FIG. 5.

For the sake of illustration and understanding, FIG. 6 illustrates an example scenario of a circular ROI 600 with the vehicle 10 in a center of the ROI and overlaid within the map 500 of the lane segments. Any lane segment touched or enclosed by the ROI is considered "in proximity" to the vehicle 10. Other lane segments in the map vector 500 may be ignored by the on-board computing device 1710, in some embodiments. The ROI 600 may be a geometric-shaped area surrounding the vehicle 10. In various embodiments, the ROI 600 may have a particular radius to a boundary of the area and with the vehicle 10 located at or near a center of the ROI 600. It should be understood, that the vehicle 10 does not have to be located at a center of a ROI.

Wrong-Way Direction

Figure 2:
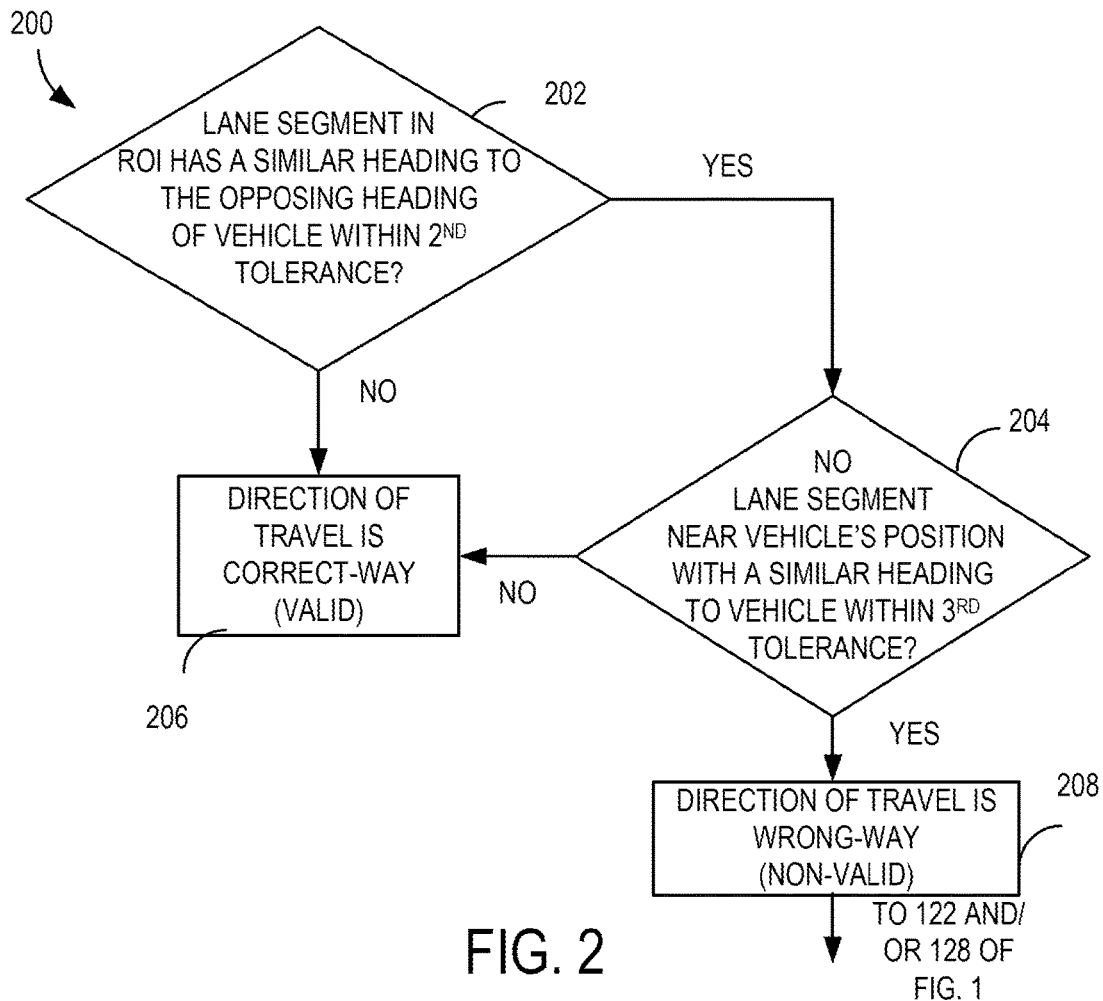
FIG. 2 illustrates a flow chart of an example method for validating heading motion of the vehicle.

FIG. 2 illustrates a flow chart of an example method 200 for assessing the direction of travel, at 116, of FIG. 1 to validate the heading motion of the vehicle 10. FIG. 2 will be described in relation to example scenarios depicted in FIGS. 7A and 8.

Returning again to FIG. 2, the method 200 for assessing the direction of travel may assess whether the vehicle is driving in a wrong-way direction. The method 200 may check for false positives such as, without limitation, whether the vehicle 10 is i) driving onto a two-way road, or a parking lot or other area with no assigned direction (FIG. 8); ii) driving in a center turn lane; or iii) veering into an oncoming lane (i.e., a lane with a direction of travel that is opposite that of the vehicle's) to pass a parked car 20 (FIG. 9). The condition at the vehicle's direction of travel must satisfy may require that there be no such false positives. At 202, the on-board computing device 1710 may determine whether there is a lane segment, in proximity to the vehicle 10, that has a similar heading to the opposing heading (within the second tolerance) of the vehicle 10. If the determination at 202 is "YES," the on-board computing device 1710 may determine whether there is no lane segment near the vehicle's position with a similar heading (within the third tolerance) to the vehicle 10, at 204.

In various embodiments, only lane segments where a car or truck is capable of driving should be considered in the list of lane segments of the ROI. In other words, bike lanes, parking lanes, and bus lanes optionally may not be considered in this process. Both criteria at 202 and 204 may be checked to avoid false positives when the vehicle 10 is driving on a two-way road, driving in a center turn lane (where there are lanes both matching and opposing the vehicle's heading overlaid on one another), or when the vehicle 10 veers into the oncoming lane to pass a parked car, as illustrated in FIGS. 9-12. Thus, at 204, if the determination is "NO," the on-board computing device 1710 determines that the vehicle 10 is traveling in the direction of the correct-way, at 206. The assessment may determine that the motion of the vehicle is valid, at 206. By way of non-limiting example, an alert is not generated when the vehicle is performing any of the maneuvers of FIGS. 9-12 because there is a lane segment near the vehicle's position with a similar heading as the sensed direction of travel of the vehicle. In addition, the vehicle is able to drive across lanes with headings determined to be at an angle of intersection for the road geometry relative to the sensed direction of travel without a need for an alert.

Specifically, depending on the situations, if the determination at either of 202 and 204 is "NO," the on-board computing device 1710 may determine that the motion (i.e., direction of travel) is the correct-way or valid. If the determination at 204 is "YES," the on-board computing device 1710 may detect that the vehicle is traveling in a direction that is a wrong-way, at 208, so that an alarm may be generated, at 128, and, in some embodiments, a corrective action taken as determined, at 122. At 208, the direction of travel by the vehicle is determined to be non-valid based on the high-definition map data and the preset tolerances.

In various scenarios, the preset tolerance used to determine "similar heading" may be small to avoid registering false positives. Example scenarios relate to when the vehicle 10 is preparing to enter a lane segment from outside any lanes (e.g., at the start of a predicted veering or turning motion, when the vehicle 10 is within the drivable area but not within a lane segment), as will be described in relation to FIGS. 9-12. Based on the heading data, the on-board computing device 1710 may determine which lane segments are pointed in the same direction as the vehicle 10, and which are not.

One-Way Lane

Figure 7A:
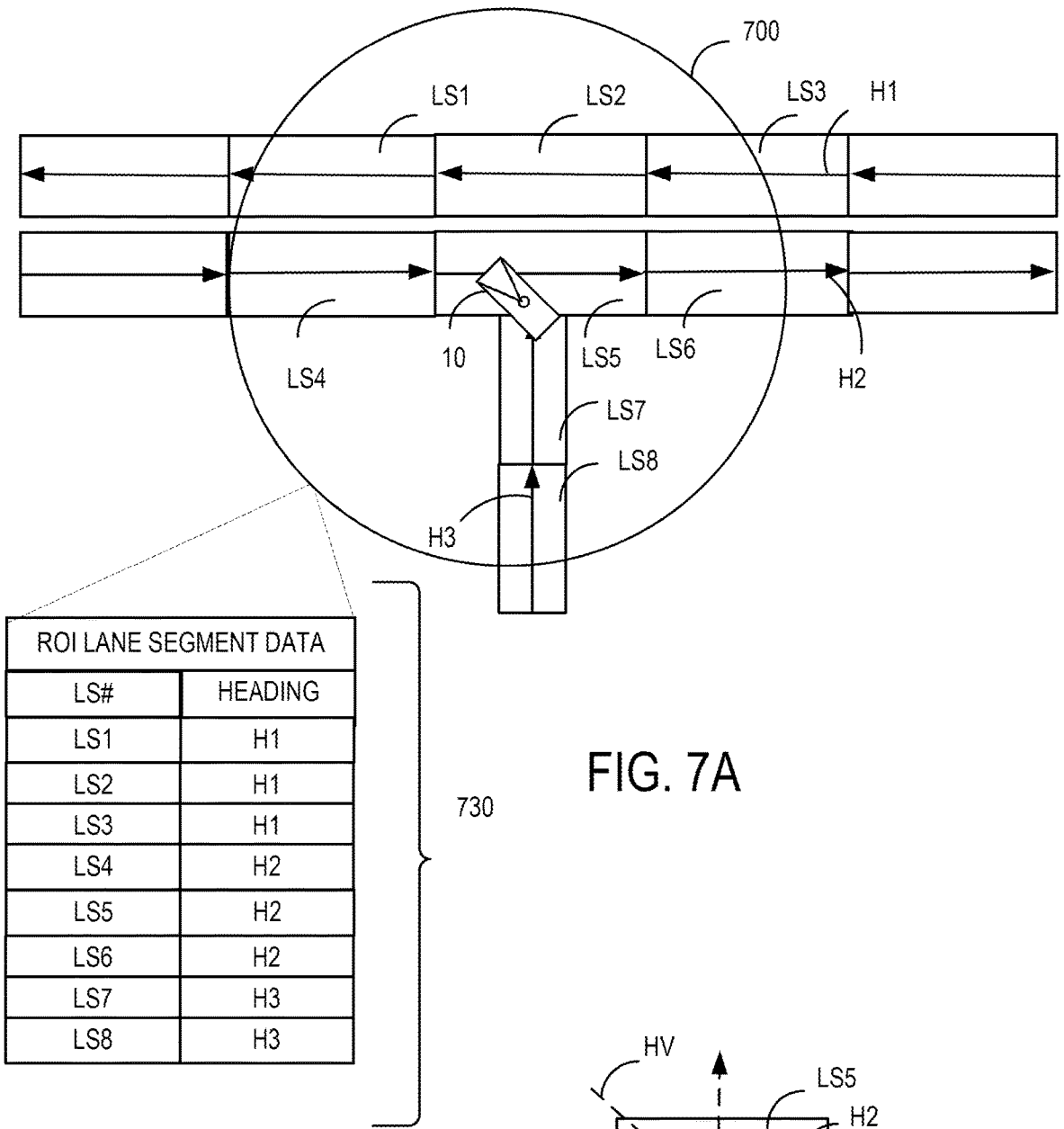
FIG. 7A illustrates an example scenario of a vehicle turning a wrong-way onto a one-way intersecting street in the map of lane segments of FIG. 5.
Figure 7B:
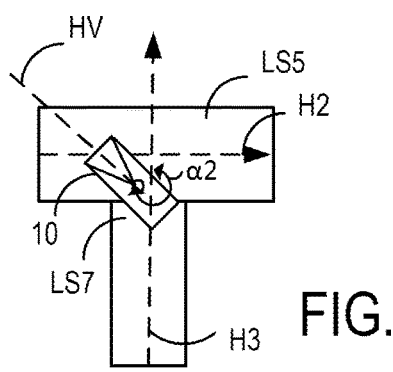
FIG. 7B illustrates an example angle between a vehicle heading and a heading of a lane segment.

For illustrative purposes, FIG. 7A illustrates an example scenario of a vehicle turning onto a wrong-way intersecting street in the map of lane segments. The ROI 600 (FIG. 6) may be updated, by the on-board computing device 1710, as the vehicle travels. For example, as the vehicle 10 travels along the lane segments of the map, those lane segments of the prior ROI 600 that are no longer in proximity of the vehicle 10 are ignored or removed from a list of lane segments. The on-board computing device 1710 may select lane segments, if they are within a particular radius surrounding the vehicle 10.

In operation, the on-board computing device 1710 may access the high-definition map data 1771 of high-definition map and select the ROI lane segment data 1774 that is representative of an example list 730. Assume for the illustration of FIG. 7A, a list 730 of those lane segment data in the ROI 700 include lane segments LS1-LS8. The list 730 includes at least the heading data for each lane in the current ROI 700. The lane segments LS4-LS6 have a heading that corresponds to the heading of the vehicle 10 and corresponds to heading H1. Heading H1 is an East heading, as the arrow is directed to the right of the page. Lane segments LS1-LS3 are adjacent and parallel to lane segments LS4-LS6 but have a heading H2 that is in an opposite direction of lane segments LS4-LS6 and the vehicle 10. Heading H3 is a West heading, as the arrow is directed to the left of the page. Lane segments LS7-LS8 have a heading H3 that intersects heading H1, for example. Heading H3 is a North heading, as the arrow is directed toward the top of the page. In the example of FIG. 7A, assume the vehicle 10 turns onto lane segment LS7. The motion of the vehicle may be based on the current state of the vehicle sensed by sensors 1735 (FIG. 17) such as a location sensor 1760. A first tolerance as described may be compared with angle α2 to determine the current vehicle heading relative to the lane segment heading (i.e., heading H3) to assess "opposing" headings before a full and after turn is made, such as shown in FIG. 7B. Using the frame of reference in FIG. 7B, the angle α2 is greater than 180°. Since the angle α2 is outside of the first tolerance (i.e., the angle beyond which the lane heading is considered to be opposite that of the vehicle's direction), an alert would be generated. After the full turn is made, the vehicle 10 may have an angle α2 of approximately 180°, which is in the first tolerance range.

In FIG. 7A, the vehicle 10 has part of the vehicle's body in lane segment LS5 and part encroaching into lane segment LS7. FIG. 7B illustrates an example angle α2 between a vehicle heading and a heading of a lane segment LS7. An example angle α2 is denoted as the angle between the computed heading HV of the vehicle 10 relative to heading 113 from list 730. Thus, at 202, the on-board computing device 1710 would retrieve the ROI lane segment data of list 730 to determine that the vehicle 10 is turning onto lane segment LS7 and its heading 113 that is a North direction. However, based on the sensors 1735, the on-board computing device 1710 may determine that the heading of the vehicle 10 is heading generally South, which is opposite that of heading 113 for lane segment LS7 based on some preset tolerance, such as the second tolerance.

Two-Way Lanes

Figure 8:
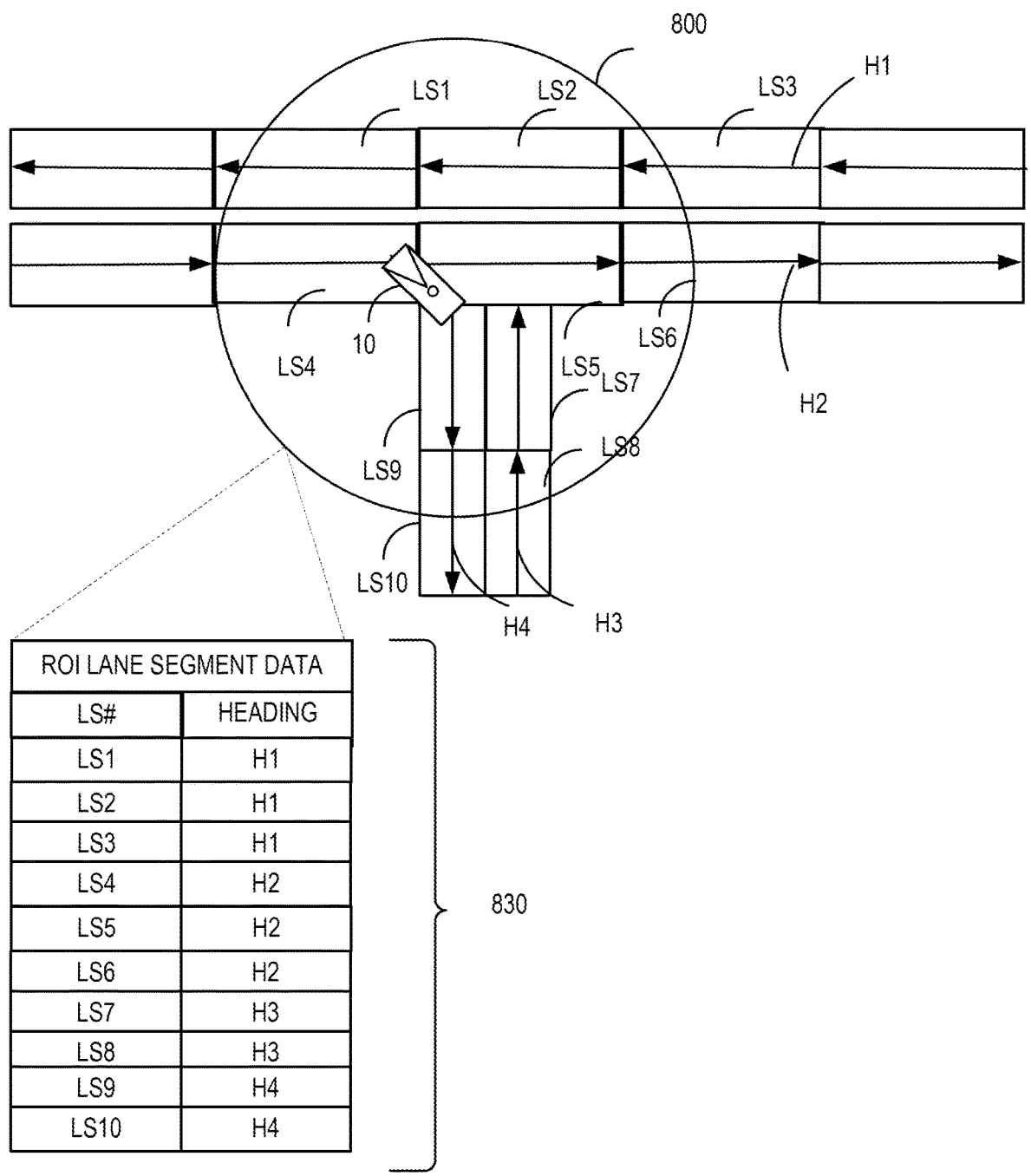
FIG. 8 illustrates an example scenario of a vehicle turning onto a two-way intersecting street in a high-definition map of lane segments.

FIG. 8 illustrates an example scenario of a vehicle turning onto a two-way intersecting street in a high-definition map of lane segments. In this scenario, the vehicle 10 is turning onto lane segment LS9 with a heading 114 that is a South direction. Accordingly, at 202, the on-board computing device 1710 may retrieve the ROI lane segment data of list 830 to determine that the vehicle 10 to turn onto lane segment LS9 and its heading 114. The list 830 is similar to list 730 but also includes lane segments LS9-LS10 and their headings 114.

In the scenario of FIG. 8, at 202, the on-board computing device 1710 may also determine, from the ROI lane segment data of list 830, the presence of the lane segments LS7 and LS8 with heading 113, based on their proximity to lane segment LS9, for example. In this example, the determination, at 202, is "YES" because the heading of lane segments LS7 and LS8 opposes the heading of the vehicle.

Based on the sensors 1735, the on-board computing device 1710 may determine that the heading of the vehicle 10 is the same as that of heading 114 for lane segment LS9 within some preset tolerance (i.e., the third tolerance). Hence, at 204, the on-board computing device 1710 determines that heading 114 for lane segment 119 is a similar heading within the third tolerance.

Additional scenarios will be described in relation to FIGS. 9-12. In each of the scenarios 900, 1000, 1100 and 1200, the street has a lane segment LS4, which is in closest proximity to vehicle 10. Thus, the lane segment LS4 may sometimes be referred to as a "proximal lane segment." In each of these examples, the street has a lane segment LS1, which is in farthest from the vehicle 10. Thus, the lane segment LS1 may sometimes be referred to as a "distal lane segment." The example scenarios 1000, 1100 and 1200 show example trajectories the vehicle travels to cross the lane segments of a two-way road at various angles relative to the headings of the lane segment that is not within the second tolerance range, accordingly, an alert is not generated. For discussion purposes, assume that the driver's motion in any of the scenarios of FIGS. 9-12 are examples of valid motions.

FIG. 9 illustrates an example scenario 900 of the vehicle 10 veering around a parked car 20 into a permitted wrong-way lane segment LS1. In the scenario 900, assume that the vehicle 10 is driving in lane segment LS4 with a parked vehicle 20 ahead of the vehicle 10. The human operator of the vehicle 10 may use lane segment LS1 to go around the parked vehicle 20 by veering into the lane segment LS1 and traveling along a trajectory 910. The trajectory 910 returns the vehicle to lane segment LS4. However, lane segment LS1 has a heading that is opposing that of the vehicle's heading. If the human operator veers into the lane segment LS1, such motions will be detected as a correct-way because lane segment LS4 is in proximity to the vehicle. Hence, the determination, at 204, would be "NO."

FIG. 10 illustrates an example scenario 1000 of the vehicle 10 navigating across a two-way road from outside of the vehicle lane segments LS1 and LS4 by intersecting lane segments at an intersecting angle and making a left turn in a distal vehicle lane segment LS1. In FIG. 10, the sensed direction of travel of the vehicle is not within the second tolerance range. Hence, the determination, at 202, would be "NO." Alternately, once the vehicle reaches lane segment LS1, the lane segment is within the third tolerance range. Hence, the determination, at 204, would be "NO." Accordingly, using the method 200 of FIG. 2, an alert is not generated since the motion is valid.

FIG. 11 illustrates an example scenario 1100 of the vehicle 10 navigating across a two-way street from outside of the vehicle lanes by making a U-turn onto distal lane segment LS1. In FIG. 11, the vehicle 10 has the same direction of heading as lane segment LS4. Then, the vehicle's motion proceeds to cross lane segment LS4 to lane segment LS1 at an intersection angle not within the second and third tolerance ranges. Hence, the determination, at 202, would be "NO." Alternately, once the vehicle reaches lane segment LS1, the lane segment is within the third tolerance range. Hence, the determination, at 204, would be "NO." Accordingly, using the method 200 of FIG. 2, an alert is not generated since the motion is valid.

FIG. 12 illustrates another example scenario 1200 of the vehicle 10 navigating across a two-way street from outside of the vehicle lanes by making a left turn in a distal vehicle lane segment LS1. Initially, the vehicle 10 has a direction that is opposite that of lane segment LS4. However, lane segment LS1 is present with a direction corresponding to the same direction as the vehicle. As the vehicle 10 proceeds across the lane segments, it travels at an intersecting angle that is not within the second tolerance range and then makes a left turn onto lane segment LS1. Hence, the determination, at 202, would be "NO." Alternately, once the vehicle reaches lane segment LS1, the lane segment is within the third tolerance range. Hence, the determination, at 204, would be "NO." Accordingly, using the method 200 of FIG. 2, an alert is not generated since the motion is valid.

In the examples scenarios 1000, 1100 and 1200, the vehicle 10 in each of these scenarios is outside of the lane segments of the map. For example, the vehicle 10 could be in a parking lane, grass, emergency lane, or the like, which is not generally marked for vehicle travel. It should be understood, that these example scenarios are for illustrative purposes and should not be limiting in any way.

Wrong-Way Path Correction

Figure 3:
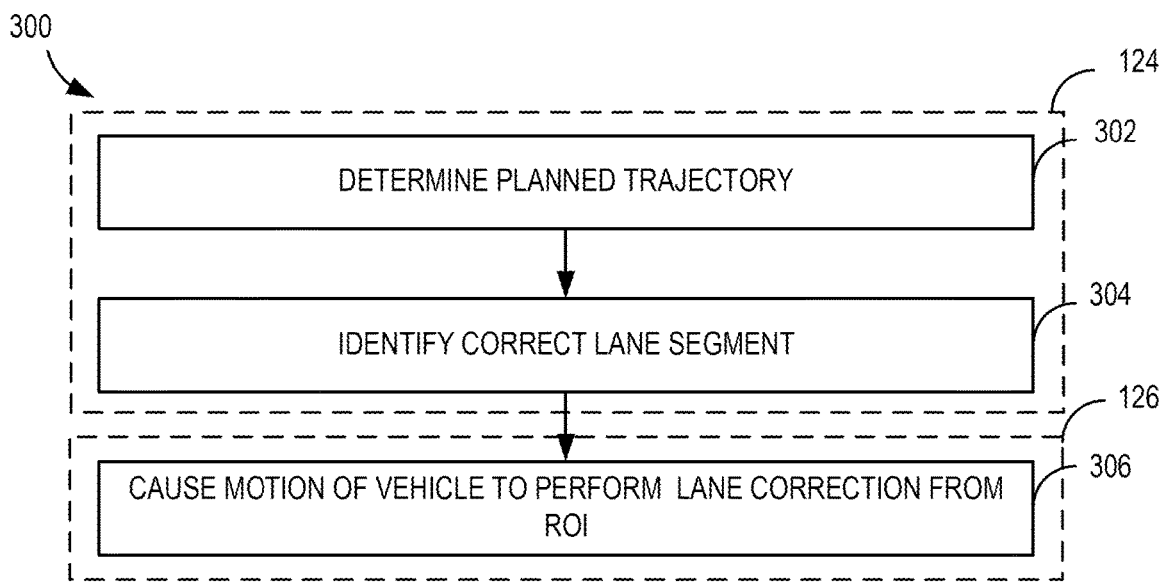
FIG. 3 illustrates a flow chart of an example method for generating a motion correction.

FIG. 3 illustrates a flow chart of an example method 300 for generating wrong-way motion correction. In general, the method 300 incorporates the activities at 124 and 126 of FIG. 1 related to the wrong-way path correction. At 302, the on-board computing device 1710 may determine, in the ROI, a planned trajectory of the vehicle 10. The path trajectory, at 302, corresponds to the predicted future states of the automated vehicle 10 including, without limitation, for a particular vehicle's speed, direction, pose and location. Each location of the trajectory may be stored in a data store or memory 1770. At 304, the on-board computing device 1710 may identify a correction lane segment or maneuver that corrects the direction of travel to be the correct-way. Specifically, the activities, at 124 of FIG. 1, correspond to those activities of 302 and 304.

The on-board computing device 1710 may, in response to determining that the direction of travel for the vehicle is a wrong-way, prevent the vehicle 10 from executing the turn into the intersecting street (i.e., lane segment LS7) or an adjacent lane segment with an opposing heading. This may include a turn into an intersecting street that intersects a street in which the vehicle is currently traveling. This may also include identifying a lane segment of the intersecting street into which the automated vehicle will enter when the automated vehicle turns into the intersecting street. At 306, the on-board computing device 1710 may cause the motion of the vehicle to perform a wrong-way correction using a lane segment in the ROI. It should be understood that the operation at 306 corresponds to example activities, at 126 of FIG. 1.

At 306, the on-board computing device 1710 may generate a control signal to control at least one of a steering controller 1724, a speed controller 1728 and a brake controller 1723 of the vehicle 10.

The system 1700 may define the ROI as a circle in which the vehicle is positioned at a center point of the circle. In the example of FIG. 7A, if the vehicle was traveling in lane segment LS5, for example, but driving in an opposite direction than heading 113, the vehicle may be controlled to change lanes to lane segment LS2, for example.

Traffic Control Measure (TCM)

Figure 4A:
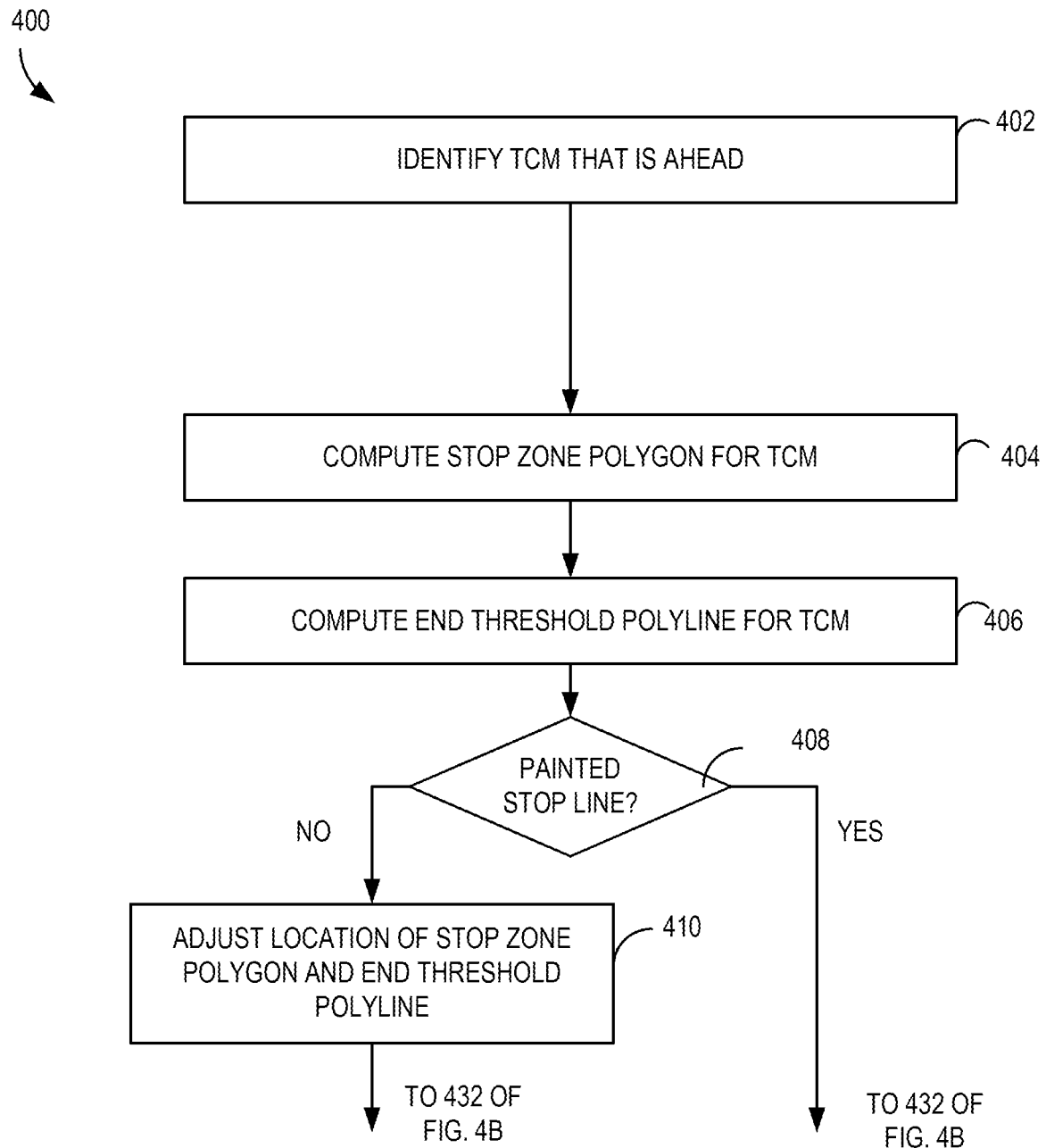
FIGS. 4A-4C illustrate a flow chart of an example method for validating motion of a vehicle based on detected traffic control measures.
Figure 4B:
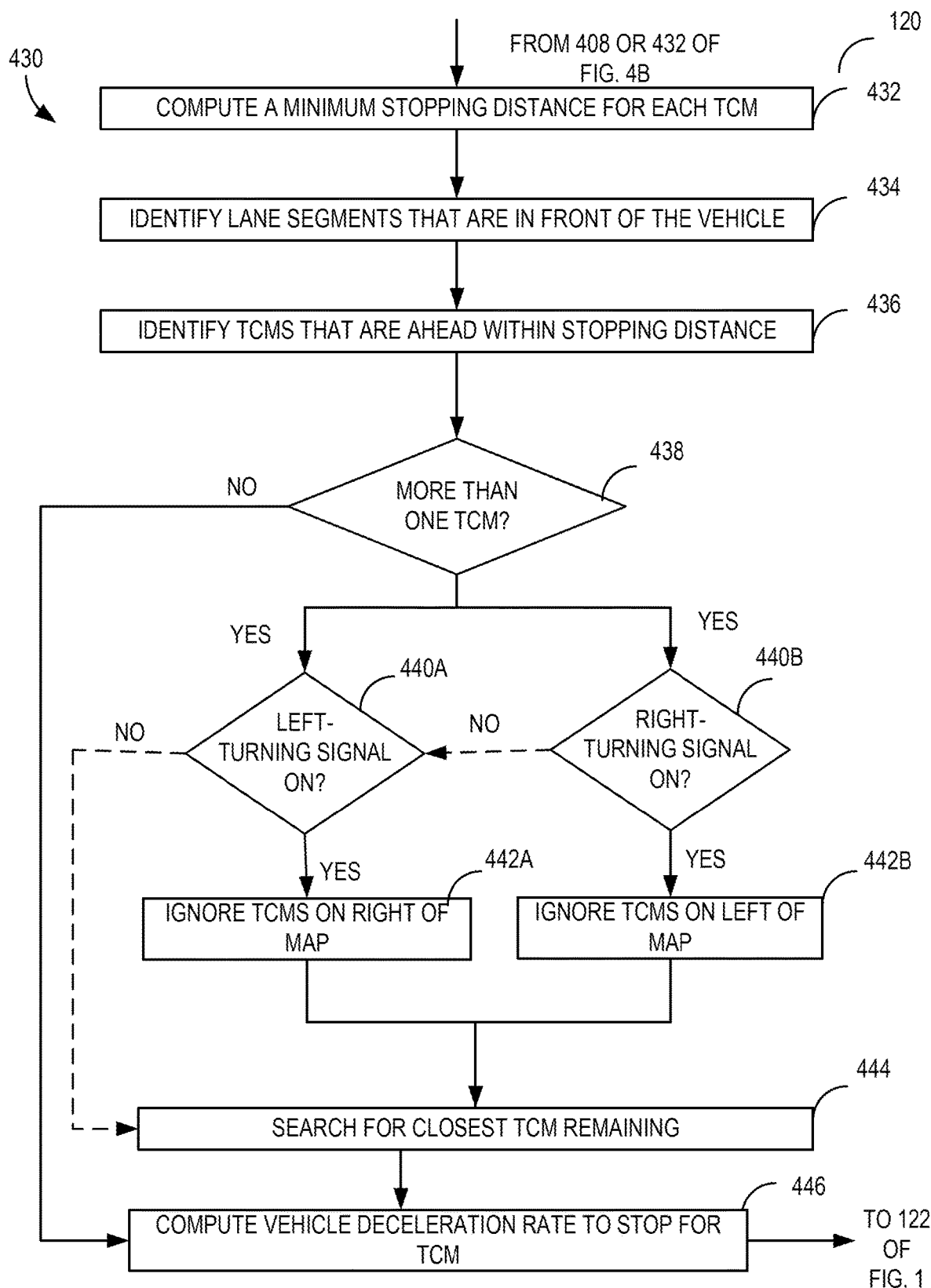
Figure 4C:
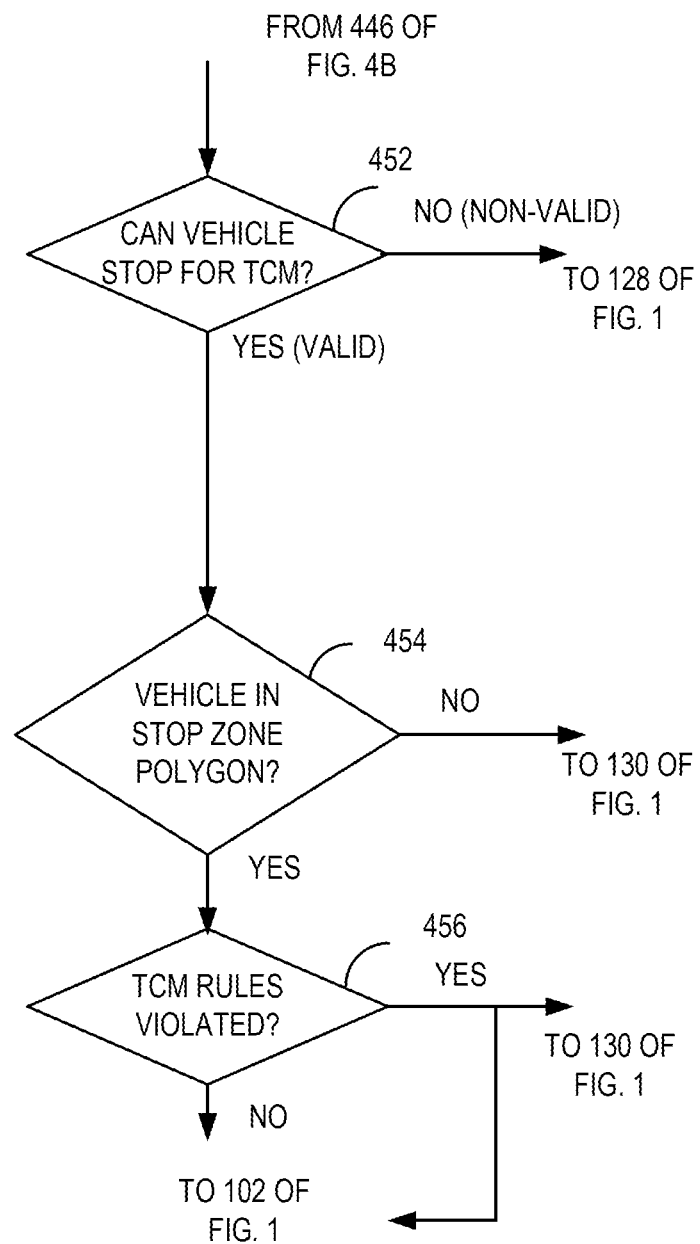

FIG. 4A-4C illustrates a flow chart of an example method 400 for validating motion of a vehicle based on detected traffic control measures. The method 400 corresponds to activities of 120 of FIG. 1. Referring now to FIG. 4A, the on-board computing device 1710 may identify traffic control measures, at 402, which the vehicle 10 must stop in a ROI and specifically the area of the ROI that is forward of the vehicle. The traffic control measures may be retrieved from the data of the vector map associated with the ROI. The traffic control measures may be associated with a lane segment, for example. In some embodiments, the start of a lane segment or an end of a lane segment may be associated with a traffic control measure. The on-board computing device 1710 may compute a stop zone polygon, at 404, and an end threshold polyline, at 406, as will be described later in relation to FIGS. 13-14.

At 408, the on-board computing device 1710 may determine whether the traffic control measure has a painted stop line. If the determination, at 408, is "NO," the on-board computing device 1710 may adjust the location of the stop zone polygon and end threshold to be before the intersection, in various embodiments. At 410, for a stop sign with no painted stop line, rather than requiring the vehicle to stop at the stop sign, it may be preferred to require it to stop before entering other lanes of traffic, as will be described in relation to FIG. 15. This might be preferred as in some cities stop signs with no painted lines are placed very far from the intersection. Accordingly, the placement of the stop zone polygon and end threshold may vary based on geographical location data such as for cities, neighborhoods or other jurisdictions with unique painted stop line requirements.

At 408, if the determination is "YES," or after 410, the method 400 may proceed to FIG. 4B. Before describing FIG. 4B, the example scenarios of traffic control measures will be described in relation to the examples of FIGS. 13-15.

Figure 13:
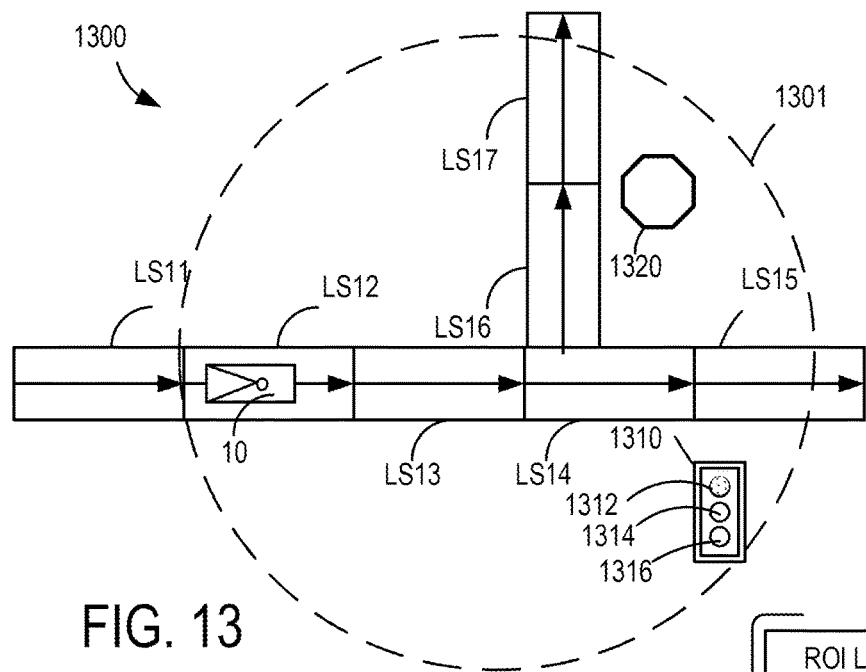
FIG. 13 illustrates an example scenario of a high-definition map of lane segments with various traffic control measures indicated.
Figure 14:
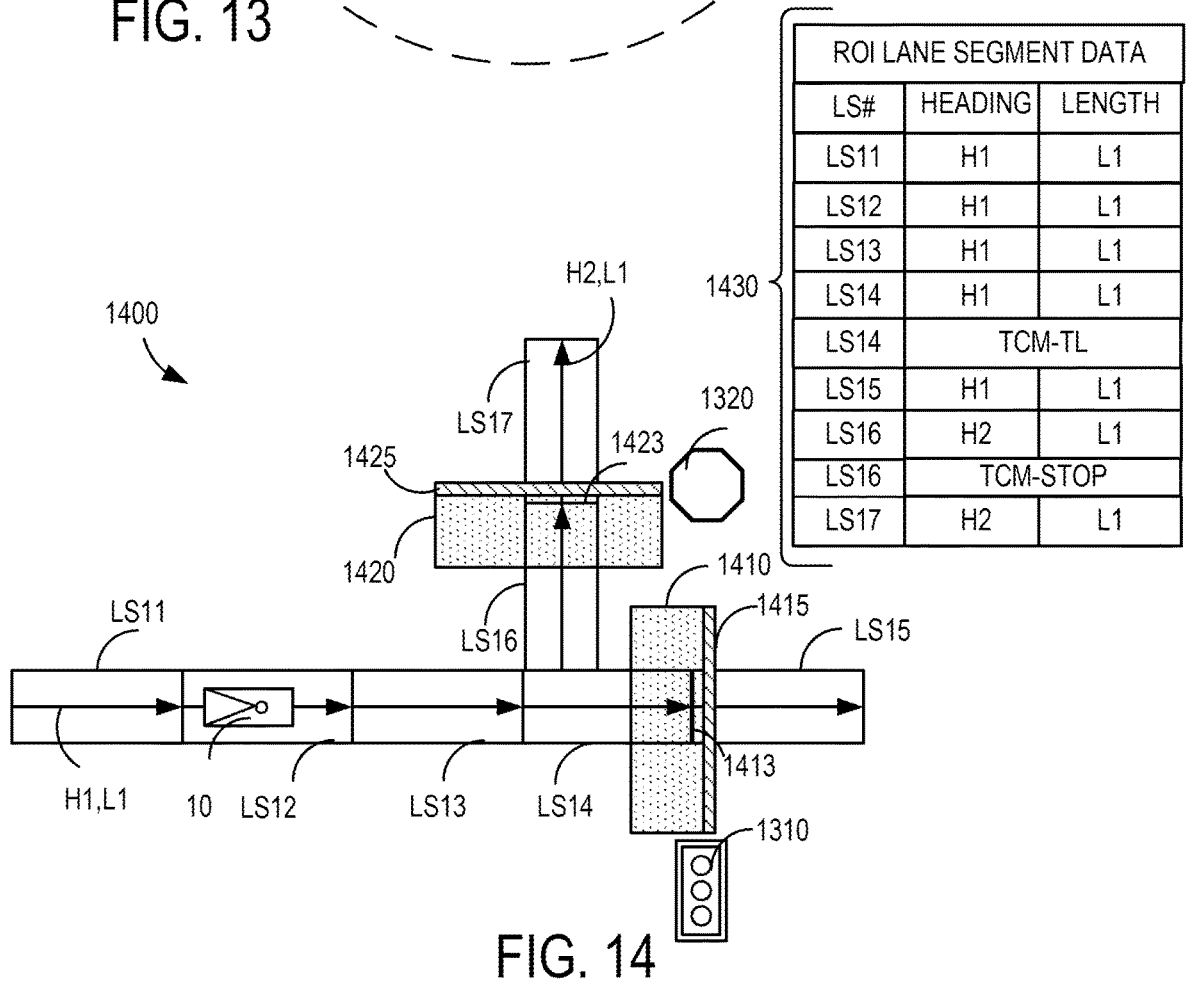
FIG. 14 illustrates an example scenario of the high-definition map of lane segments of FIG. 13 with computed stop zone polygons and polylines overlaid on the map.

FIG. 13 illustrates an example scenario of a high-definition map 1300 of lane segments with various traffic control measures 1310 and 1320 indicated in ROI 1301. FIG. 14 illustrates an example scenario 1400 of the high-definition map of lane segments of FIG. 13 with computed stop zone polygons 1410 and 1420 and end threshold polylines 1415 and 1425 overlaid on the map 1300 (FIG. 13). To prevent crowding of the figure, the ROI has been omitted from FIG. 14. As shown, the vehicle 10 is traveling along a road with lane segments LS11-LS15. The map 1300 also includes lane segments LS16-LS17. The map 1300 may include traffic control measure 1310 that is a traffic light (TL). The traffic control measure 1310 includes a red light 1312, a yellow light 1314 and a green light 1316. In the illustration, only one light is illuminated at a time for the sake of discussion. In this instance, assume that the red light 1312 is illuminated, as denoted by the dotted hatching of the light 1312.

The vehicle may determine that the light is red by processing images of the light that the vehicle captures via on-board cameras, and/or by V2X communications that report the light's state via an external system of which the traffic light is a part. The map also includes traffic control measure 1320 that is a stop sign. The on-board computing device 1710 may use the lane segment data of the high-definition map data 1771 to determine whether the vehicle 10 can stop in time for the traffic control measures that are ahead of the vehicle in the direction of travel. Some of those traffic control measures can be on an intersecting street to the current path of the vehicle.

In the illustration of FIG. 14, a traffic control measure 1310 is positioned essentially at the end of lane segment LS14 or the beginning of lane segment LS15, as an example. In FIG. 14, an example list 1430 of lane segment data for the ROI ahead of the vehicle is shown. The stop zone polygon 1410 is shown overlaid on top of the end of lane segment LS14 or the beginning of lane segment LS15 with a dotted hatching. The end threshold polyline 1415 is denoted in diagonal line hatching, which begins where the stop zone polygon ends and is extended a distance into the next lane segment (i.e., lane segment LS15). The dividing line 1413 is a demarcation point between lane segment LS14 and LS15 with a heading H1. The heading H1 is represented as an East heading with lane segment LS15 represented as East of lane segment LS14. Each lane segment is associated with a length L1. In the list of 1430, "TCM-TL" represents data entry associated with a traffic light type of traffic control measure. In the list 1430, the "TCM-STOP" represents data entry associated a stop-sign-type traffic control measure. Although not shown, the ROI lane segment data in list 1430 may include data associated with a width of the polygon of each lane segment.

In the illustration, a traffic control measure 1320 is positioned essentially at the end of lane segment LS16 or the beginning of lane segment LS17. The stop zone polygon 1420 is shown overlaid on top of the end of lane segment LS16 or the beginning of lane segment LS17 with a dotted hatching. The end threshold polyline 1425 is denoted in diagonal line hatching, which begins where the stop zone polygon ends and is extended a distance into the next lane segment (i.e., lane segment LS17). The dividing line 1423 is a demarcation point between lane segment LS16 and LS17 with a heading 112. The heading 112 is represented as a North heading with lane segment LS17 represented as North of lane segment LS16.

It should be understood, that the end threshold polyline may be positioned at the stop line, or slightly past it, if it is acceptable for the vehicle to stop a little over the stop line. It may extend far to the left and right of the lane segment, in case the driver of the vehicle 10 needs to veer out of lane to the left or right (for example, to avoid an obstruction) to navigate the road. The vehicle 10 veering into the expanded region of the stop zone and the polyline may be an example of normal driving motion of a driver. It should be understood, the stop zone polygon 1420 may be computed by the on-board computing device 1710 to generate a polygon to extend some distance backward from the end threshold polyline 1425, covering the area in which the vehicle must stop.

Figure 15:
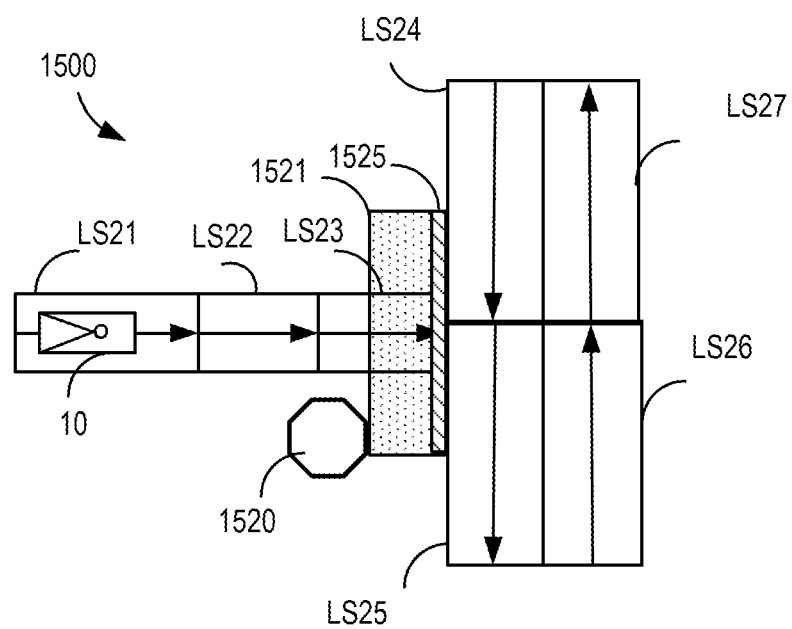
FIG. 15 illustrates an example scenario of a high-definition map of lane segments with a traffic control measure in advance of an intersection between a one-way street and a two-way street.

FIG. 15 illustrates an example scenario 1500 of a map of lane segments with a traffic control measures 1520 in advance of an intersection of a one-way road and a two-way road. For a stop sign with no painted stop line, rather than requiring the vehicle 10 to stop at the stop sign, it may be preferred to require it to stop before entering other lanes of traffic.

The scenario 1500 may include lane segments LS21-LS23, which are represented as one-way, heading East. The scenario 1500 may include traffic control measure 1520 that is a stop sign. The scenario 1500 may include lane segments LS24-LS25 that intersect lane segment LS23. The lane segments LS24-LS25 have a South heading. The scenario 1500 may include lane segments LS26-LS27 that intersect lane segment LS23 and are parallel to lane segments LS24-LS25. The lane segments LS26-LS26 have a North heading. In the example, the lengths of the lane segments LS22-LS23 have lengths that are different from lengths of other lane segments in FIG. 15.

In the scenario 1500, the traffic control measure 1520 may be positioned between lane segments LS22 and LS23. However, the stop zone polygons 1521 and end threshold polylines 1525 are located at the intersection of lane segments LS23 and lane segments LS24-LS25, corresponding to activities at 410 of FIG. 4A.

Returning now to FIG. 4B, at 432, the on-board computing device 1710 may compute the minimum stopping distance at the vehicle's current speed and (reasonable) deceleration/jerk rate to a traffic control measure, such as traffic control measures 1310 and 1320 of FIG. 13. Example deceleration/jerk rates are described later. An example algorithm for determining minimum stopping distance is $d=v^2/2a$, in which v=the vehicle's velocity and a=the vehicle's acceleration.

The minimum stopping distance may also be based on ambient environmental conditions as determined by the environmental sensors 1768. For example, in the presence of rain, snow, or surface type may vary the friction coefficient. The stopping distance may be computed by calculating a reaction time and a braking time. The minimum stopping distance is the shortest stopping distance for a particular deceleration rate.

At 434, the on-board computing device 1710 may identify, from the high-definition map data, the lane segments in the map in front of the vehicle 10. The lane segments in front of the vehicle 10 may correspond to those lane segments, which are in the direction of travel or have the same heading as the vehicle 10. These lane segments may be part of the ROI but only those lane segments, which are ahead of the vehicle 10. The on-board computing device 1710 may retrieve the ROI lane segment data 1774. The ROI lane segment data 1774 may include the length of each of the lane segments in front of the vehicle 10. To simplify the discussion, assume that all the lane segments have the same length L1, as shown in FIG. 14. It should be understood, that the lane segments may have different lengths, as shown in FIG. 15.

At 436, the on-board computing device 1710 may search for all the active traffic control measures (stop signs/red or yellow lights) for lane segments ahead of the vehicle 10, within the minimum stopping distance, for which the vehicle 10 has not already stopped within a stop zone polygon. As used in this disclosure, an "active" traffic control measure may include traffic control measures that are in front of the vehicle and the vehicle has not already stopped. In the case of traffic lights, when assessing whether the traffic control measure is "active" a determination may be made whether the light will be red such that the vehicle should be stopped. The high-definition map data 1771 may include pre-stored traffic light timing data.

Figure 16:
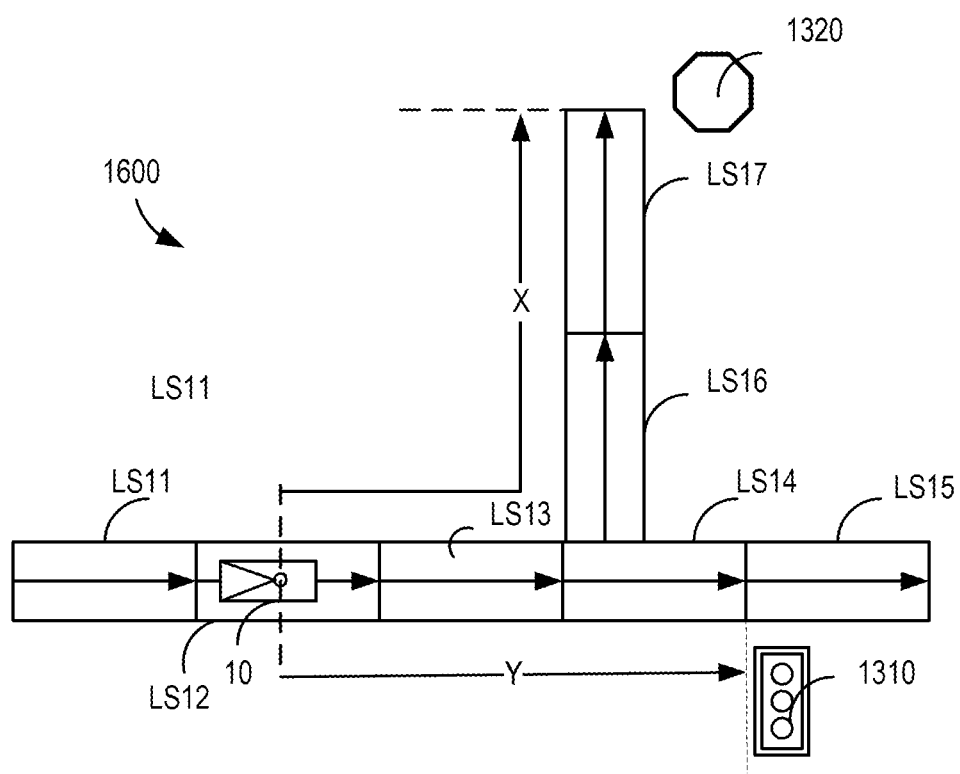
FIG. 16 illustrates an example scenario of the high-definition map of lane segments of FIG. 13 with the distances to each of two traffic control measures indicated.

At 438, the on-board computing device 1710 may determine if more than one traffic control measure is found in the ROI lane segment data 1774. For example, if the road branches off into different lane segments, such as shown in FIGS. 13, 14 and 16, one or more traffic control measures may be found on those branches. At 438, if the determination is "YES," the on-board computing device 1710 may detect whether a left-turning signal of the vehicle 10 is activated, at 440A or whether a right-turning signal of the vehicle 10 is activated, at 440B.

The turning signal direction may allow the on-board computing device 1710 to determine which path the vehicle is more likely to take. For example, if the vehicle 10 has its left-turning signal activated, as determined, at 440A, the on-board computing device 1710 may ignore traffic control measures, at 442A, which would require making a right turn for the vehicle to reach it. On the other hand, if the vehicle 10 has its right-turning signal activated, as determined, at 440B, the on-board computing device 1710 may ignore traffic control measures, at 442B, which would require the vehicle to make a left turn for the vehicle to reach it.

At 440A and 440B, if the determination is "NO," the on-board computing device 1710 may proceed to 444. At 444, the on-board computing device 1710 may perform a search for the closest of the eligible active traffic control measures, based on the distance the vehicle 10 would have to travel to reach it, as will be described in more detail in relation to FIG. 16. At 446, the on-board computing device 1710 may compute the deceleration rate required to stop for the traffic control measure.

Referring now to FIG. 4C, at 452, the on-board computing device 1710 may determine whether the vehicle 10 can stop for the traffic control measure under evaluation at the current deceleration rate for the stopping distance. If the determination is "YES," the condition is satisfied and the vehicle's motion is valid. If the determination is "NO," the condition is not satisfied and the vehicle's motion is non-valid.

Multiple thresholds can be used for additional granularity, for example, when calculating the stopping distance and the deceleration rate. A first threshold may be used for "moderate deceleration," (e.g., 2.0 m/second/second (s) deceleration rate). The "moderate deceleration" may have a first (reasonable) deceleration jerk. A second threshold may be used for "urgent deceleration," (e.g., 2.5 m/s/s deceleration rate). The "urgent deceleration" may have a second deceleration jerk that is different from the first deceleration jerk. The second deceleration jerk may be stronger than the first deceleration jerk. A third threshold may be used for yellow lights beyond, which no alert is sounded. For example, if the vehicle would have to decelerate the vehicle's speed at a deceleration rate, which is greater than 3 m/s/s to stop the vehicle 10 for a yellow light, the driver should likely just proceed through the yellow light.

In some embodiments, the driver may be provided with information associated with the necessary deceleration rate to meet the stopping distance. However, if it is determined based on the computations that the vehicle cannot stop for the TCM using one of the deceleration rates, the motion is non-valid because the deceleration rate is out-of-limits to achieve a stop of the vehicle in the stop zone polygon up to the end threshold polyline.

The on-board computing device 1710 may repeat one or more steps of the method 400 to recalculate the stopping distance with a different deceleration rate before determining that vehicle 10 cannot stop for the traffic control measure, at 452, and providing an alert, at 128 (FIG. 1).

After determining whether the vehicle can stop for the traffic control measure, the system may then monitor vehicle operations to determine when the vehicle has reached the stop threshold polyline. Once that happens, at 454, the on-board computing device 1710 may determine whether the vehicle has stopped in the stop zone polygon. At 454, if the determination is "NO," the on-board computing device 1710 may log the event, at 130 in FIG. 1. At 454, if the determination is "YES," the on-board computing device 1710 may also determine whether the traffic measure control rules have been violated by the driver, at 456. At 456, if the determination is "YES," the on-board computing device 1710 may log the event, at 130 in FIG. 1. From 456, the method may return to 102 of FIG. 1. At 456, if the determination is "NO," the on-board computing device 1710 may also return to 102 of FIG. 1.

Example rules will now be described. In various embodiments, before the vehicle body of the vehicle 10 touches the end threshold polyline, the driver of the vehicle 10 must stop the vehicle within the stop zone polygon. If the vehicle 10 is not stopped before touching the end threshold polyline, it is considered to have "run the stop sign" or violated the traffic control measure rules. In another example rule, once the vehicle 10 has stopped in the stop zone polygon for a stop sign or equivalent traffic control measure, such as a flashing red light or a red light at which it is permissible to make a right on red), the end threshold polyline can be ignored and the vehicle 10 may proceed. In another example rule, once the vehicle 10 has stopped in the stop zone polygon for a red traffic light at which it is not permitted to proceed, it must remain stopped until the light turns green. If the vehicle crosses the end threshold polyline while the light is red, it is treated as having violated the traffic control measure. It should be understood that there are many rules for different traffic control measures and should not be limited in any way to those described above. If the vehicle 10 violates the traffic control measure, the event is logged for later analysis, at 130.

The process for searching for the closest traffic control measure remaining, at 444, will now be described. FIG. 16 illustrates an example scenario 1600 of a map of lane segments with distances to various traffic control measures. In this situation, the vehicle may detect multiple candidate traffic control measures ahead of the vehicle in the lane in which the vehicle is traveling. If the vehicle has activated a traffic signal before reaching the first candidate TCM, the system may use this information to determine which TCM it should slow or stop before turning. For example, the system may rank the active candidate traffic control measures based on distances from the vehicle to the next eligible traffic signal (ranking the closest one first, the next closest one second, etc.) The system may then determine a distance between the vehicle and each of the candidate control measures, whether by measured distance or by a number of remaining lane segments in the region of interest between the vehicle and the candidate traffic control measures. The system may then select the traffic control measure at which the vehicle will turn based on either or both of the distance and the vehicle turning signal state. For example, the vehicle 10 may reach a traffic control measure 1320 (i.e., stop sign) in X feet=45 feet, if it turns left onto lane segment LS16, for example. The stopping distance is based on the lengths of each lane segment to the traffic control measure 1320. The vehicle 10 may reach another traffic control measure 1310 (i.e., traffic light) in Y feet=30 feet, if it continues straight. If the vehicle 10 has its left-turn signal on, the traffic control measure 1320 (i.e., the stop sign) will be selected as the nearest eligible active traffic control measure; if not, the traffic control measure 1310 (i.e., traffic light) will be selected.

The methods 100, 200, 300, and 400 may be implemented using hardware, firmware, software or a combination of any of these. For instance, methods 100, 200, 300, and 400 may be implemented as part of a microcontroller, processor, and/or graphics processing units (GPUs) and an interface with a register, data store and/or memory 1770 (FIG. 17) for storing data and programming instructions, which when executed, performs the steps of methods 100, 200, 300, and 400 described herein.

FIG. 17 illustrates an example architecture of a system 1700 with an on-board computing device 1710 for an automated vehicle. The system 1700 may perform machine learning employing feature extraction algorithms for detecting the objects and the speed of the object. The feature extraction algorithms may include, without limitation, edge detection, corner detection, template matching, dynamic texture processing, segmentation image processing, motion detection, object tracking, background subtraction, object recognition and classification, etc.

The system 1700 may control the navigation and motion of the automated vehicle (at 126). By way of non-limiting example, the veering control signal may be sent to the steering controller 1724 by the on-board computing device 1710.

With specific reference to FIG. 17, the system 1700 may include an engine or motor 1702 and various sensors 1735 for measuring various parameters of the vehicle 10 and/or its environment. The system 1700 may be integrated into a vehicle body. The automated vehicle 10 may be fully automated or semi-automated. Operational parameter sensors 1735 that are common to both types of vehicles include, for example: a position sensor 1736 such as an accelerometer, gyroscope and/or inertial measurement unit; a speed sensor 1738; and an odometer sensor 1740. The system 1700 also may have a clock 1742 that the system architecture uses to determine vehicle time during operation. The clock 1742 may be encoded into s vehicle on-board computing device 1710, it may be a separate device, or multiple clocks may be available.

The system 1700 also may include various sensors that operate to gather information about the environment in which the vehicle is traveling. These sensors may include, for example: a location sensor 1760 such as a global positioning system (GPS) device; object detection sensors such as one or more cameras 1762, a laser detection and ranging (LADAR) system and/or light detecting and ranging (LIDAR) system 1764, radio detection and ranging (RADAR) system and/or a sound navigation and ranging (SONAR) system 1766. The object detection sensors may be part of a computer vision system. The sensors 1735 also may include environmental sensors 1768 such as a precipitation sensor and/or ambient temperature sensor. The object detection sensors may enable the system 1700 to detect objects that are within a given distance or range of the vehicle 10 in any direction, while the environmental sensors collect data about environmental conditions within the vehicle's area of travel. The system 1700 will also include one or more cameras 1762 for capturing images of the environment, such as images of TCMs as described above.

During operations, information is communicated from the sensors to an on-board computing device 1710. The on-board computing device 1710 analyzes the data captured by the sensors and optionally controls operations of the vehicle based on results of the analysis. For example, the on-board computing device 1710 may control braking via a brake controller 1723; direction via a steering controller 1724; speed and acceleration via a throttle controller 1726 (in a gas-powered vehicle) or a motor speed controller 1728 (such as a current level controller in an electric vehicle); a differential gear controller 1730 (in vehicles with transmissions); and/or other controllers such as an auxiliary device controller 1754. The on-board computing device 1710 may include one or more communication links to the sensors 1735.

The system 1700 also may include a transceiver 1790 that is capable of receiving signals via external systems, such as V2X communications from external TCMs, other vehicles, or other objects.

The on-board computing device 1710 may be implemented using hardware, firmware, software or a combination of any of these. For instance, the on-board computing device 1710 may be implemented as part of a microcontroller, processor, and/or graphics processing units (GPUs). The on-board computing device 1710 may include or interface with a register, data store and/or memory 1770 for storing data and programming instructions, which when executed, performs vehicle navigation based on sensor information, such as from cameras and sensors of a computer vision system.

The on-board computing device 1710 may include ROI generator 1712 for performing the functions at 102 (FIG. 1). The ROI generator 1712 may be implemented using hardware, firmware, software or a combination of any of these. For instance, ROI generator 1712 may be implemented as part of a microcontroller, processor, and/or graphics processing units (GPUs). The ROI generator 1712 may include or interface with a register, data store or memory 1770 for storing data and programming instructions, which when executed, generates a ROI (i.e., ROI 600 (FIG. 6), 700 (FIG. 7), or 1301 (FIG. 13)) of a geometric shape with a particular radius and with the vehicle 10 in the center of the ROI. For example, the radius may be 50 feet to 100 feet. The radius may be in the range of 10-300 feet. It should be understood, the radius may vary based on whether the vehicle is driving in the city or in a suburb. As the vehicle is driven, the ROI generator 1712 may be configured to update the ROI on a high-definition map.

The on-board computing device 1710 may include a map selector 1714 for performing the functions at 104 and/or 106 (FIG. 1). The map selector 1714 may be implemented using hardware, firmware, software or a combination of any of these. For instance, map selector 1714 may be implemented as part of a microcontroller, processor, and/or graphics processing units (GPUs). The map selector 1714 may include or interface with a register, data store or memory 1770 for storing data and programming instructions, which when executed, looks up a portion of the map that corresponds to the ROI (i.e., ROI 600 (FIG. 6), 700 (FIG. 7) or 1301 (FIG. 13)), retrieve high-definition map data associated the ROI, and/or extract the lane segment data of the lane segments in the ROI.

The on-board computing device 1710 may include a motion monitor 1716 for performing the functions at 108 and/or 110 (FIG. 1). The motion monitor 1716 may be implemented using hardware, firmware, software or a combination of any of these. For instance, motion monitor 1716 may be implemented as part of a microcontroller, processor, and/or graphics processing units (GPUs). The motion monitor 1716 may include or interface with a register, data store or memory 1770 for storing data and programming instructions, which when executed, determines a direction of travel and speed of the vehicle 10 using sensed data from sensors 1735 and/or monitors the motion of the vehicle 10 based on the lane segment data.

The on-board computing device 1710 may include a motion validator 1718 for performing the function at 112 (FIG. 1). The motion validator 1718 may be implemented using hardware, firmware, software or a combination of any of these. For instance, motion validator 1718 may be implemented as part of a microcontroller, processor, and/or graphics processing units (GPUs). The motion validator 1718 may include or interface with a register, data store or memory 1770 for storing data and programming instructions, which when executed, detects whether a traffic control measure in in the path and/or the vehicle 10 is driving in a wrong-way direction. The motion validator 1718 may include or interface with a register, data store or memory 1770 for storing data and programming instructions, which when executed, assesses valid motion associated with the current state of the vehicle and an imminent a traffic control measure in in the path identified in the high-definition map data. The motion validator 1718 may include or interface with a register, data store or memory 1770 for storing data and programming instructions, which when executed, assesses validity associated with the current driving direction of the vehicle and an imminent lane segment in the path identified in the high-definition map data to determine whether the vehicle 10 is driving in a wrong-way direction.

The on-board computing device 1710 may include a motion corrector 1720 for performing the function at 123 (FIG. 1). The motion corrector 1720 may be implemented using hardware, firmware, software or a combination of any of these. For instance, motion corrector 1720 may be implemented as part of a microcontroller, processor, and/or graphics processing units (GPUs). The motion corrector 1720 may include or interface with a register, data store or memory 1770 for storing data and programming instructions, which when executed, controls the vehicle to perform a motion correction such that the vehicle returns to a valid motion condition. In some embodiments, motion correction may include slowing the vehicle at a deceleration rate that is within the limits to stop in a stop zone polygon. In other embodiments, the motion correction may include preventing veering or steering of the vehicle or causing a vehicle to make a safe U-turn. Other motion corrections are contemplated to safely correct the motion of the vehicle until it returns to a valid motion condition associated with wrong-way directions and stopping distances to traffic control measures.

The on-board computing device 1710 may include an alert generator 1721 for performing the function at 128 (FIG. 1). The alert generator 1721 may be implemented using hardware, firmware, software or a combination of any of these. For instance, alert generator 1721 may be implemented as part of a microcontroller, processor, and/or graphics processing units (GPUs). The alert generator 1721 may include or interface with a register, data store or memory 1770 for storing data and programming instructions, which when executed, generates a control signal to cause the driver warning system 1780 to generate an alert using one or more of an audible alert, a visual alert or a vibration alert representative of the vehicle traveling in a wrong-way direction and/or to an imminent traffic control measure with an out-of-limit deceleration rate.

The on-board computing device 1710 may include a logging module 1722 for performing the function, at 130 (FIG. 1). The logging module 1722 may be implemented using hardware, firmware, software or a combination of any of these. For instance, logging module 1722 may be implemented as part of a microcontroller, processor, and/or graphics processing units (GPUs). The logging module 1722 may include or interface with a register, data store or memory 1770 for storing data and programming instructions, which when executed, logs the event data or information associated with alerts. The event data corresponds to the vehicle's sensor data from sensors 1735, current lane segment data, traffic control measure data, and non-valid motion detection data. The event data may include logging of violation of rules associated with traffic control measures and/or stopping locations by the vehicle associated with the stop zone polygon. The event data or information may include images captures in the area representative of poor signage.

The on-board computing device 1710 may perform machine learning for planning the motion of the vehicle along a route from an origination location to a destination location of global coordinate system. The parameter may include, without limitation, motor vehicle operation laws of a jurisdiction (i.e., speed limits), objects in a path of the vehicle, scheduled or planned route, traffic lights of intersections, and/or the like.

Geographic location information may be communicated from the location sensor 1760 to the on-board computing device 1710, which may then access a map of the environment that corresponds to the location information to determine known fixed features of the environment such as streets, buildings, stop signs and/or stop/go signals. The map includes map data 1771. In addition or alternatively, the vehicle 10 may transmit any of the data to a remote server system (not shown) for processing. Any known or to be known technique for making an object detection based on sensor data and/or captured images can be used in the embodiments disclosed in this document.

To determine a heading (i.e., sensed direction of travel) of the automated vehicle, the on-board computing device 1710 may determine the location, orientation, pose, etc. of the automated vehicle in the environment (localization) based on, for example, three dimensional position data (e.g., data from a GPS), three dimensional orientation data, predicted locations, or the like. For example, the on-board computing device 1710 may receive GPS data to determine the automated vehicle's latitude, longitude and/or altitude position. Other location sensors or systems such as laser-based localization systems, inertial-aided GPS, or camera-based localization may also be used to identify the location of the vehicle. The location of the vehicle 10 may include an absolute geographical location, such as latitude, longitude, and altitude as well as relative location information, such as location relative to other cars immediately around it, which can often be determined with less noise than absolute geographical location. The map data 1774 can provide information regarding: the identity and location of different roadways, lane segments, buildings, or other items, the location, boundaries, and directions of traffic lanes (e.g., the location and direction of a parking lane, a turning lane, a bicycle lane, or other lanes within a particular roadway) and metadata associated with traffic lanes, traffic control data (e.g., the location and instructions of signage, traffic lights, or other traffic control measures); and/or any other map data 1774 that provides information that assists the on-board computing device 1710 in analyzing the surrounding environment of the automated vehicle 10. The map data 1774 may also include information and/or rules for determining right of way of objects and/or vehicles in conflicted areas or spaces.

In certain embodiments, the map data 1774 may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In various implementations, an on-board computing device 1710 may determine perception information of the surrounding environment of the automated vehicle 10. Based on the sensor data provided by one or more sensors and location information that is obtained, the on-board computing device 1710 may determine perception information of the surrounding environment of the automated vehicle 10. The perception information may represent what an ordinary driver would perceive in the surrounding environment of a vehicle. The perception data may include information relating to one or more objects in the environment of the automated vehicle 10. For example, the on-board computing device 1710 may process perception data that includes sensor data (e.g., LADAR data, LIDAR data, RADAR data, SONAR data, camera images, etc.) in order to identify objects and/or features in the environment of automated vehicle 10. The objects may include traffic signals, road way boundaries, other vehicles, pedestrians, and/or obstacles, etc. The on-board computing device 1710 may use any now or hereafter known object recognition algorithms, video tracking algorithms, and computer vision algorithms (e.g., track objects frame-to-frame iteratively over a number of time periods) to determine the perception. The perception information may include objects identified by discarding ground LIDAR point, as discussed below.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

As described above, this document describes methods for navigating a vehicle. The method may be executed by a processor, or by system that includes the processor and a computer-readable medium containing programming instructions to implement the method. Optionally, the system may be part of a vehicle. Some embodiments also include computer program products with programming instructions that are configured to cause a processor to implement the method.

In various embodiments, the method may include extracting lane segment data associated with lane segments of a vector map that are within a region of interest, and analyzing the lane segment data and a heading of the vehicle to determine whether motion of the vehicle satisfies a condition. The condition can be associated with (i) an association between the heading of the vehicle and a direction of travel of a lane that corresponds to the current location of the vehicle and/or (ii) a minimum stopping distance to an imminent traffic control measure in the lane that corresponds to the current location of the vehicle. When the motion does not satisfy the condition, the methods may also include causing the vehicle to perform a motion correction.

In various embodiments, the methods may further include controlling a driver warning system of the vehicle to generate and output a driver alert of non-valid motion.

In certain embodiments, causing the vehicle to perform the motion correction may include generating a control signal to control a steering controller, a speed controller, and/or a brake controller of the vehicle. Optionally, the motion correction action can include at least one of the following with respect to the motion of the vehicle: decelerating, stopping, or veering to a lane that is different from the lane that corresponds to the current location of the vehicle.

Optionally, in certain embodiments, the lane segment data may include a lane heading for each lane segment in the region of interest, and the condition is associated with the direction of travel of the lane that corresponds to the current location of the vehicle. The lane heading corresponds to the direction of travel of the lane that corresponds to the current location of the vehicle. In such embodiments, determining whether the motion of the vehicle satisfies the condition can include: (a) determining whether any of the lane segments within the region of interest has a lane heading that is within an opposing-heading tolerance range and that is opposing the heading of the vehicle, (b) determining whether any of the lane segments within the region of interest has a lane heading that is within a similar-heading tolerance range and that is similar to the heading of the vehicle, and (c) determining that the motion does not satisfy the condition, and that the heading of the vehicle is in a wrong-way direction, when both of the following conditions are met: (i) at least one of the lane segments is determined at (a) to have the lane heading opposing the heading of the vehicle, and (ii) none of the lane segments in the region of interest is determined at (b) have the lane heading that is similar to the heading of the vehicle. The methods may also include otherwise determining that the motion of the vehicle satisfies the condition. Additionally, the methods can include causing the vehicle to perform the motion correction action that comprises preventing the vehicle from performing a veering motion in response to determining that the motion does not satisfy the condition. Optionally, whether any of the lane segments within the region of interest has the lane heading that is within the similar-heading tolerance range and that is similar to the heading of the vehicle may be determined by determining whether any of the lane segments are within a tolerance distance from the lane that corresponds to the current location of the vehicle.

Optionally, in certain embodiments, the lane segment data may include a heading and length for each lane segment, and the condition is associated with the minimum stopping distance to the imminent traffic control measure in the lane that corresponds to the current location of the vehicle In such embodiments, determining whether the motion of the vehicle satisfies the condition can include: determining a speed of travel of the vehicle, determining a minimum stopping distance representing a distance from the current location of the vehicle and a location within a stop zone that is within the lane of travel before the location of the imminent traffic control measure, and using the speed and the current location to determine whether the vehicle can stop within the minimum stopping distance. The method may also include determining that the motion does not satisfy the condition, otherwise determining that the motion satisfies the condition. Determining whether the vehicle can stop within the minimum stopping distance may include computing a rate of deceleration required to stop the vehicle at the location within the stop zone, determining if the computed rate of deceleration meets a deceleration threshold, and if the computed rate of deceleration is more than the deceleration threshold. Optionally, the methods may include causing the vehicle to perform the motion correction action that comprises changing a speed of the vehicle in response to determining that the motion does not satisfy the condition. Determining whether the motion of the vehicle satisfied the condition can also include prior to determining the minimum stopping distance, calculating a stopping zone polygon for the imminent traffic control measure; and calculating an end threshold polyline for the imminent traffic control measure that is at an end of the stopping zone polygon. The location within the stop zone may correspond to the end threshold polyline, and the minimum stopping distance may be determined through the stopping zone polygon and up to the end threshold polyline.

In some embodiments, determining whether the motion of the vehicle satisfies the condition may also include detecting a plurality of candidate traffic control measures ahead of the vehicle in a direction corresponding to the heading of the vehicle, detecting that a traffic signal activation command has been initiated in the vehicle before the vehicle reaches a first one of the candidate traffic control measures, ranking the candidate traffic control measures based on distances from the vehicle to each of the candidate control measures or remaining lane segments in the region of interest between the vehicle and the candidate traffic control measures, and selecting the imminent traffic control measure based on one or both of the distance and the vehicle turning signal state.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, automated vehicles, aircraft, aerial drones and the like. An "automated vehicle" is a vehicle having a processor, programming instructions and drivetrain components that are controllable by the processor without requiring a human operator. An automated vehicle may be fully automated in that it does not require a human operator for most or all driving conditions and functions. Alternatively, it may be semi-automated in that a human operator may be required in certain conditions or for certain operations, or that a human operator may override the vehicle's automated system and may take control of the vehicle. Automated vehicles also include vehicles in which automated systems augment human operation of the vehicle, such as vehicles with driver-assisted steering, speed control, braking, parking and other advanced driver assistance systems.

An "electronic device" or a "computing device" refers to a device that includes a processor and memory. Each device may have its own processor and/or memory, or the processor and/or memory may be conflicted with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory computer-readable medium where programming instructions and data are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LADAR system data, LIDAR system data, and/or other data.

The term "object," when referring to an object that is detected by a vehicle perception system or simulated by a simulation system, is intended to encompass both stationary objects and moving (or potentially moving) actors or pedestrians, except where specifically stated otherwise by terms use of the term "actor" or "stationary object."

In this document, when relative terms of order such as "first" and "second" are used to modify a noun, such use is simply intended to distinguish one item from another, and is not intended to require a sequential order unless specifically stated.

In addition, terms of relative position such as "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method of navigating a vehicle, the method comprising, by a processor:
   extracting lane segment data associated with lane segments of a vector map that are within a region of interest;
   analyzing the lane segment data and a heading of the vehicle to determine whether motion of the vehicle satisfies a condition associated with one or more of the following:
      an association between the heading of the vehicle and a direction of travel of a lane that corresponds to a current location of the vehicle, or
      a minimum stopping distance to an imminent traffic control measure in the lane that corresponds to the current location of the vehicle; and
   when the motion does not satisfy the condition, causing the vehicle to perform a motion correction.

2. The method of claim 1, further comprising controlling a driver warning system of the vehicle to generate and output a driver alert of non-valid motion.

3. The method of claim 1, wherein causing the vehicle to perform the motion correction comprises generating a control signal to control at least one of the following: a steering controller, a speed controller, or a brake controller of the vehicle.

4. The method of claim 3, wherein the motion correction comprises at least one of the following with respect to the motion of the vehicle: decelerating, stopping, or veering to a lane that is different from the lane that corresponds to the current location of the vehicle.

5. The method of claim 1, wherein:
   the lane segment data includes a lane heading for each lane segment in the region of interest, wherein the lane heading corresponds to the direction of travel of the lane that corresponds to the current location of the vehicle;
   the condition is associated with the direction of travel of the lane that corresponds to the current location of the vehicle; and
   determining whether the motion of the vehicle satisfies the condition comprises:
      (a) determining whether any of the lane segments within the region of interest has a lane heading that is within an opposing-heading tolerance range and that is opposing the heading of the vehicle,
      (b) determining whether any of the lane segments within the region of interest has a lane heading that is within a similar-heading tolerance range and that is similar to the heading of the vehicle, and
      (c) determining that the motion does not satisfy the condition, and that the heading of the vehicle is in a wrong-way direction, when both:
         (i) at least one of the lane segments is determined at (a) to have the lane heading opposing the heading of the vehicle, and
         (ii) none of the lane segments in the region of interest is determined at (b) have the lane heading that is similar to the heading of the vehicle,
      otherwise determining that the motion of the vehicle satisfies the condition.

6. The method of claim 5, further comprising in response to determining that the motion does not satisfy the condition, causing the vehicle to perform the motion correction that comprises preventing the vehicle from performing a veering motion.

7. The method of claim 5, wherein determining whether any of the lane segments within the region of interest has the lane heading that is within the similar-heading tolerance range and that is similar to the heading of the vehicle further comprises determining whether any of the lane segments are within a tolerance distance from the lane that corresponds to the current location of the vehicle.

8. The method of claim 1, wherein:
   the lane segment data includes a heading and length for each lane segment;
   the condition is associated with the minimum stopping distance to the imminent traffic control measure in the lane that corresponds to the current location of the vehicle; and
   determining whether the motion of the vehicle satisfies the condition comprises:
      determining a speed of travel of the vehicle,
      determining a minimum stopping distance representing a distance from the current location of the vehicle and a location within a stop zone that is within the lane of travel before the location of the imminent traffic control measure, and
      using the speed and the current location to determine whether the vehicle can stop within the minimum stopping distance by:
         computing a rate of deceleration required to stop the vehicle at the location within the stop zone,
         determining if the computed rate of deceleration meets a deceleration threshold, and if the computed rate of deceleration is more than the deceleration threshold, determining that the motion does not satisfy the condition, otherwise determining that the motion satisfies the condition.

9. The method of claim 8, further comprising in response to determining that the motion does not satisfy the condition, causing the vehicle to perform the motion correction that comprises changing a speed of the vehicle.

10. The method of claim 8, wherein the determining whether the motion of the vehicle satisfied the condition, further comprises:
   prior to determining the minimum stopping distance,
      calculating a stopping zone polygon for the imminent traffic control measure; and
      calculating an end threshold polyline for the imminent traffic control measure that is at an end of the stopping zone polygon,
   wherein the location within the stop zone corresponds to the end threshold polyline, and the minimum stopping distance is determined through the stopping zone polygon and up to the end threshold polyline.

11. The method of claim 1, wherein determining whether the motion of the vehicle satisfies the condition further comprises:
   detecting a plurality of candidate traffic control measures ahead of the vehicle in a direction corresponding to the heading of the vehicle;
   detecting that a traffic signal activation command has been initiated in the vehicle before the vehicle reaches a first one of the candidate traffic control measures;
   ranking the candidate traffic control measures based on distances from the vehicle to each of the candidate control measures or remaining lane segments in the region of interest between the vehicle and the candidate traffic control measures; and
   selecting the imminent traffic control measure based on one or both of the distance and the vehicle turning signal state.

12. A system for navigating a vehicle, the system comprising
   a vehicle having one or more sensors and an onboard computing system that comprises a processor, and a memory portion containing programming instructions that, when executed, will cause the processor to:
      extract lane segment data associated with lane segments of a vector map that are within a region of interest,
      analyze the lane segment data and a heading of the vehicle to determine whether motion of the vehicle satisfies a condition associated with one or more of the following:
         an association between the heading of the vehicle and a direction of travel of a lane that corresponds to a current location of the vehicle, or
         a minimum stopping distance to an imminent traffic control measure in the lane that corresponds to the current location of the vehicle, and
      when the motion does not satisfy the condition, cause the vehicle to perform a motion correction.

13. The system of claim 12, further comprising programming instructions to control a driver warning system of the vehicle to generate and output a driver alert of non-valid motion.

14. The system of claim 12, wherein the programming instructions, when executed, will cause the processor to cause the vehicle to perform the motion correction comprise instructions to generate a control signal to control at least one of the following: a steering controller, a speed controller, and a brake controller of the vehicle.

15. The system of claim 14, wherein the motion correction comprises at least one of the following with respect to the motion of the vehicle: decelerating, stopping, or veering to a lane that is different from the lane that corresponds to the current location of the vehicle.

16. The system of claim 12, wherein:
   the lane segment data includes a lane heading for each lane segment in the region of interest, wherein the lane heading corresponds to the direction of travel of the lane that corresponds to the current location of the vehicle;
   the condition is associated with the direction of travel of the lane that corresponds to the current location of the vehicle; and
   the instructions to determine whether the motion of the vehicle satisfies the condition comprise instructions to:
      (a) determine whether any of the lane segments within the region of interest has a lane heading that is within an opposing-heading tolerance range and that is opposing the heading of the vehicle,
      (b) determine whether any of the lane segments within the region of interest has a lane heading that is within a similar-heading tolerance range and that is similar to the heading of the vehicle, and
      (c) determine that the motion does not satisfy the condition, and that the heading of the vehicle is in a wrong-way direction, when both:
         (i) at least one of the lane segments is determined at (a) to have the lane heading opposing the heading of the vehicle, and
         (ii) none of the lane segments in the region of interest is determined at (b) have the lane heading that is similar to the heading of the vehicle,
      otherwise determine that the motion of the vehicle satisfies the condition.

17. The system of claim 12, wherein:
   the lane segment data includes a heading and length for each lane segment;
   the condition is associated with the minimum stopping distance to the imminent traffic control measure in the lane that corresponds to the current location of the vehicle; and
   the instructions to determine whether the motion of the vehicle satisfies the condition comprise instructions to:
      determine a speed of travel of the vehicle,
      determine a minimum stopping distance representing a distance from the current location of the vehicle and a location within a stop zone that is within the lane of travel before the location of the imminent traffic control measure, and
      use the speed and the current location to determine whether the vehicle can stop within the minimum stopping distance by:
         compute a rate of deceleration required to stop the vehicle at the location within the stop zone,
         determining if the computed rate of deceleration meets a deceleration threshold, and
      if the computed rate of deceleration is more than the deceleration threshold, determining that the motion does not satisfy the condition, otherwise determining that the motion satisfies the condition.

18. The system of claim 17, further comprising programming instructions that, when executed by the processor, will cause the processor to: in response to determining that the motion does not satisfy the condition, cause the vehicle to perform the motion correction that comprises changing a speed of the vehicle.

19. The system of claim 12, wherein the instructions to determine whether the motion of the vehicle satisfies the condition further comprise instructions to:
- detect a plurality of candidate traffic control measures ahead of the vehicle in a direction corresponding to the heading of the vehicle;
- detect that a traffic signal activation command has been initiated in the vehicle before the vehicle reaches a first one of the candidate traffic control measures;
- rank the candidate traffic control measures based on distances from the vehicle to each of the candidate control measures or remaining lane segments in the region of interest between the vehicle and the candidate traffic control measures; and
- select the imminent traffic control measure based on one or both of the distance and the vehicle turning signal state.

20. A computer product comprising a memory containing programming instruction that are configured to, when executed, cause a processor to:
- extract lane segment data associated with lane segments of a vector map that are within a region of interest,
- analyze the lane segment data and a heading of a vehicle to determine whether motion of the vehicle satisfies a condition associated with one or more of the following:
  - an association between the heading of the vehicle and a direction of travel of a lane that corresponds to a current location of the vehicle, or
  - a minimum stopping distance to an imminent traffic control measure in the lane that corresponds to the current location of the vehicle, and
- when the motion does not satisfy the condition, cause the vehicle to perform a motion correction.

* * * * *